United States Patent
Ichishi et al.

(10) Patent No.: US 9,371,024 B2
(45) Date of Patent: Jun. 21, 2016

(54) AIR-CONDITIONER FOR VEHICLE

(71) Applicant: DENSO CORPORATION, Kariya, Aichi-pref. (JP)

(72) Inventors: Yoshinori Ichishi, Kariya (JP); Yasushi Kondo, Aichi-gun (JP); Yoshinori Yanagimachi, Takahama (JP); Satoshi Izawa, Chiryu (JP); Motohiro Yamaguchi, Toyokawa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 603 days.

(21) Appl. No.: 13/760,372

(22) Filed: Feb. 6, 2013

(65) Prior Publication Data

US 2013/0206382 A1 Aug. 15, 2013

(30) Foreign Application Priority Data

Feb. 13, 2012 (JP) ................................. 2012-028632
Feb. 17, 2012 (JP) ................................. 2012-033150
Aug. 9, 2012 (JP) ................................. 2012-177359

(51) Int. Cl.
*B60H 1/00* (2006.01)
*B60N 2/56* (2006.01)

(52) U.S. Cl.
CPC .............. *B60N 2/56* (2013.01); *B60H 1/00285* (2013.01); *B60H 1/00735* (2013.01); *B60N 2/5628* (2013.01); *B60N 2/5635* (2013.01); *B60N 2/5685* (2013.01); *B60N 2/5692* (2013.01)

(58) Field of Classification Search
CPC ...... B60N 2/56; B60N 2/5692; B60N 2/5628; B60N 2/5685; B60N 2/5635; B60H 1/00735; B60H 1/00285

USPC ......................................................... 165/202
See application file for complete search history.

(56) References Cited

U.S. PATENT DOCUMENTS

| 5,537,831 A | 7/1996 | Isaji et al. |
| 2002/0104324 A1* | 8/2002 | Homan .............. B60H 1/00735 62/176.2 |
| 2005/0085968 A1* | 4/2005 | Panic .................. B60N 2/0244 701/36 |
| 2006/0042788 A1* | 3/2006 | Naruse ............... B60H 1/00028 165/202 |

(Continued)

FOREIGN PATENT DOCUMENTS

| JP | 62-4006 Y2 | 1/1987 |
| JP | 3-116590 | 12/1991 |

(Continued)

OTHER PUBLICATIONS

Office Action mailed Aug. 25, 2015 in corresponding JP Application No. 2012-177359 with English translation.
Office Action dated Oct. 21, 2014 in corresponding Japanese Application No. 2012-33150.

*Primary Examiner* — Marc Norman
*Assistant Examiner* — Jon T Schermerhorn
(74) *Attorney, Agent, or Firm* — Harness, Dickey & Pierce, P.L.C.

(57) ABSTRACT

An air-conditioner conducts an air-conditioning for a passenger compartment of a vehicle, and has an eco-mode to save energy. The air-conditioner includes a seat temperature control system and a controller. The seat temperature control system is configured to operate to heat or cool a seat in the passenger compartment. The controller automatically activates the seat temperature control system when the eco-mode is set.

15 Claims, 27 Drawing Sheets

(56) References Cited

U.S. PATENT DOCUMENTS

| | | |
|---|---|---|
| 2008/0168766 A1 | 7/2008 | Oomura |
| 2010/0176110 A1 | 7/2010 | Ogino et al. |
| 2011/0067422 A1* | 3/2011 | Ichishi ................. B60H 3/0085 62/176.1 |
| 2014/0110489 A1* | 4/2014 | Yasui ................... B60N 2/0244 237/5 |

FOREIGN PATENT DOCUMENTS

| | | |
|---|---|---|
| JP | 9-286225 | 11/1997 |
| JP | 2000-318435 | 11/2000 |
| JP | 2001-130247 | 5/2001 |
| JP | 2003-254636 | 9/2003 |
| JP | 2010-264936 | 11/2010 |

* cited by examiner

AIR-CONDITIONER FOR VEHICLE

CROSS REFERENCE TO RELATED APPLICATION

This application is based on Japanese Patent Application No. 2012-28632 filed on Feb. 13, 2012, Japanese Patent Application No. 2012-33150 filed on Feb. 17, 2012, and Japanese Patent Application No. 2012-177359 filed on Aug. 9, 2012, the disclosures of which are incorporated herein by reference in their entirety.

TECHNICAL FIELD

The present disclosure relates to an air-conditioner for a vehicle.

BACKGROUND

JP-Y2-62-4006 describes a conventional air-conditioner for a vehicle, and a seat heater which is automatically controlled according to an opening of an air mix door or a target blow-off temperature. Moreover, it is well-known that energy is required to be saved in air-conditioning by setting an eco-mode.

In the case where the seat heater is controlled according to the opening of the air mix door or the target blow-off temperature, the seat heater may be activated only when a temperature in the passenger compartment is low. An occupant in a passenger compartment may feel cold when the seat heater is not activated. Especially at the eco-mode time, an occupant is more likely to feel cold, because the air-conditioning level (degree) is lowered in the eco-mode time to save energy.

The seat heater of JP-Y2-62-4006 is embedded in a seat of the vehicle. Electric power supplied to the seat heater is controlled by a controller. Specifically, the electric power supplied to the seat heater is increased, as the opening of the air mix door is increased, or as the target blow-off temperature is raised.

The heat generating amount of the seat heater is automatically controlled according to the load of the air-conditioning such as the opening of the air mix door or the target blow-off temperature. When the load is large (for example, at a very cold time), the heat generating amount of the seat heater is increased to accelerate the warm-up effect of the seat heater. On the other hand, when the load is small, the heat generating amount of the seat heater is reduced to avoid wasteful energy consumption.

However, if outside air temperature is very low at the very cold time, the opening of the air mix door or the target blow-off temperature is set into a large (high) value. If the large value is maintained for a long time, the heat generating amount of the seat heater is also maintained as large even after the temperature in the passenger compartment becomes stable. In this case, an occupant in the passenger compartment feels too hot due to the too much heat of the seat heater. Similarly, if the outside air temperature is very high at a very hot time such as summer, the occupant may feel too cold.

SUMMARY

According to a first example of the present disclosure, an air-conditioner that conducts an air-conditioning, which has an eco-mode to save energy, for a passenger compartment of a vehicle includes a seat temperature control system and a controller. The seat temperature control system heats or cools a seat in the passenger compartment. The controller automatically activates the seat temperature control system when the eco-mode is set.

According to a second example of the present disclosure, an air-conditioner that conducts an air-conditioning for a passenger compartment of a vehicle includes an air conditioning unit, a seat conditioning unit and a controller. The air conditioning unit controls a temperature of air in the passenger compartment. The seat conditioning unit controls a temperature of a seat in the passenger compartment. The controller controls a conditioning degree of the seat conditioning unit. The controller decreases the conditioning degree of the seat conditioning unit over time after the controller starts controlling the conditioning degree of the seat conditioning unit when the air conditioning unit automatically controls the temperature of air in the passenger compartment.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
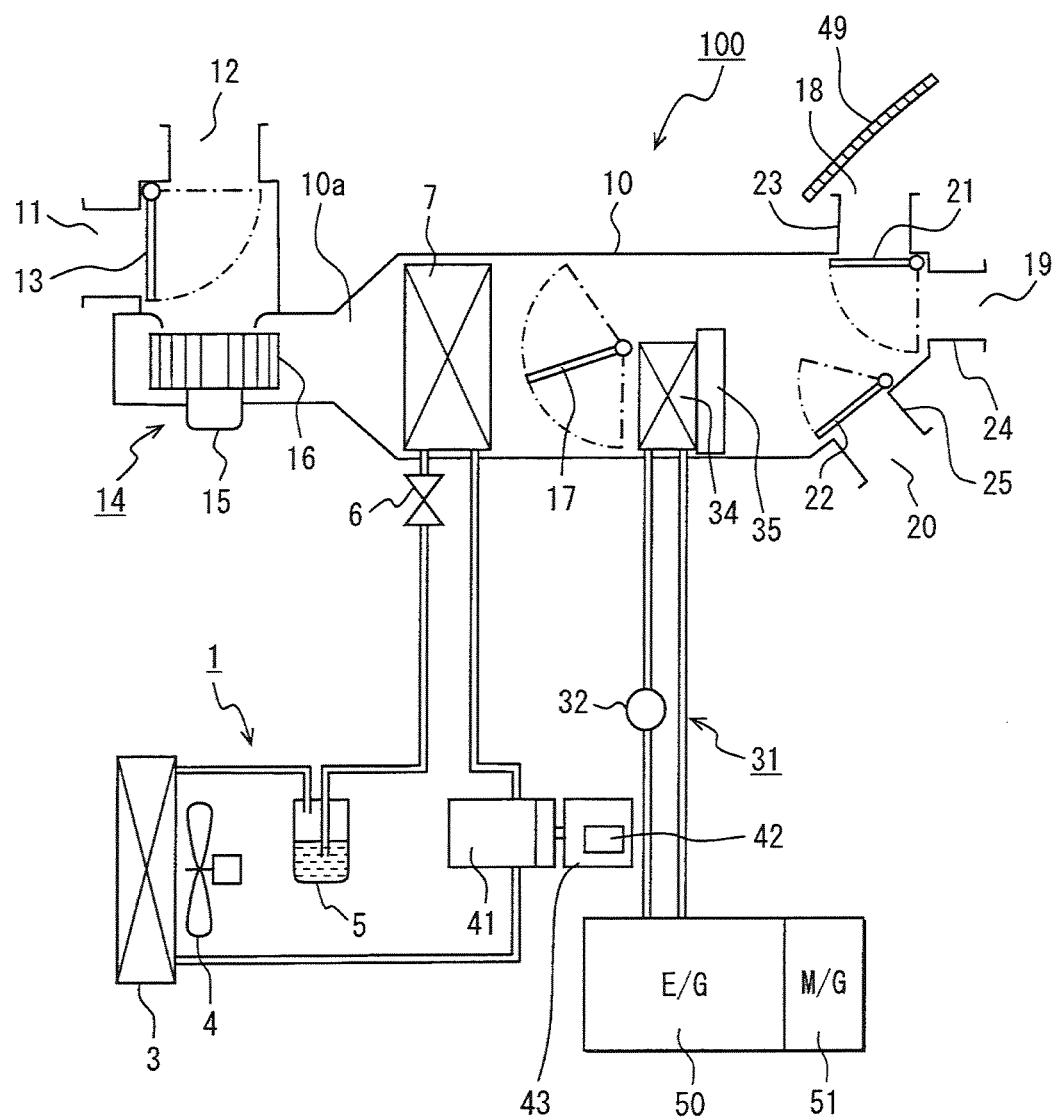
FIG. 1 is a schematic diagram illustrating an air-conditioner according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be specifically described with reference to FIGS. 1-16. A driving force driving a driving wheel of a vehicle is switched to be transmitted from a motor generator 51 (M/G) or an engine 50 (E/G) by a hybrid electronic control unit (hybrid ECU, not shown). Further, the hybrid ECU controls charge and discharge of a battery (not shown) corresponding to an in-vehicle electricity storing equipment.

The battery has a charging apparatus (not shown) for charging electric power consumed by air-conditioning and driving of the vehicle. The charging apparatus has an outlet to be connected to an electricity supply source such as a power station or utility power source (home-use power source). The battery is charged by connecting the electricity supply source to the outlet.

Figure 3:
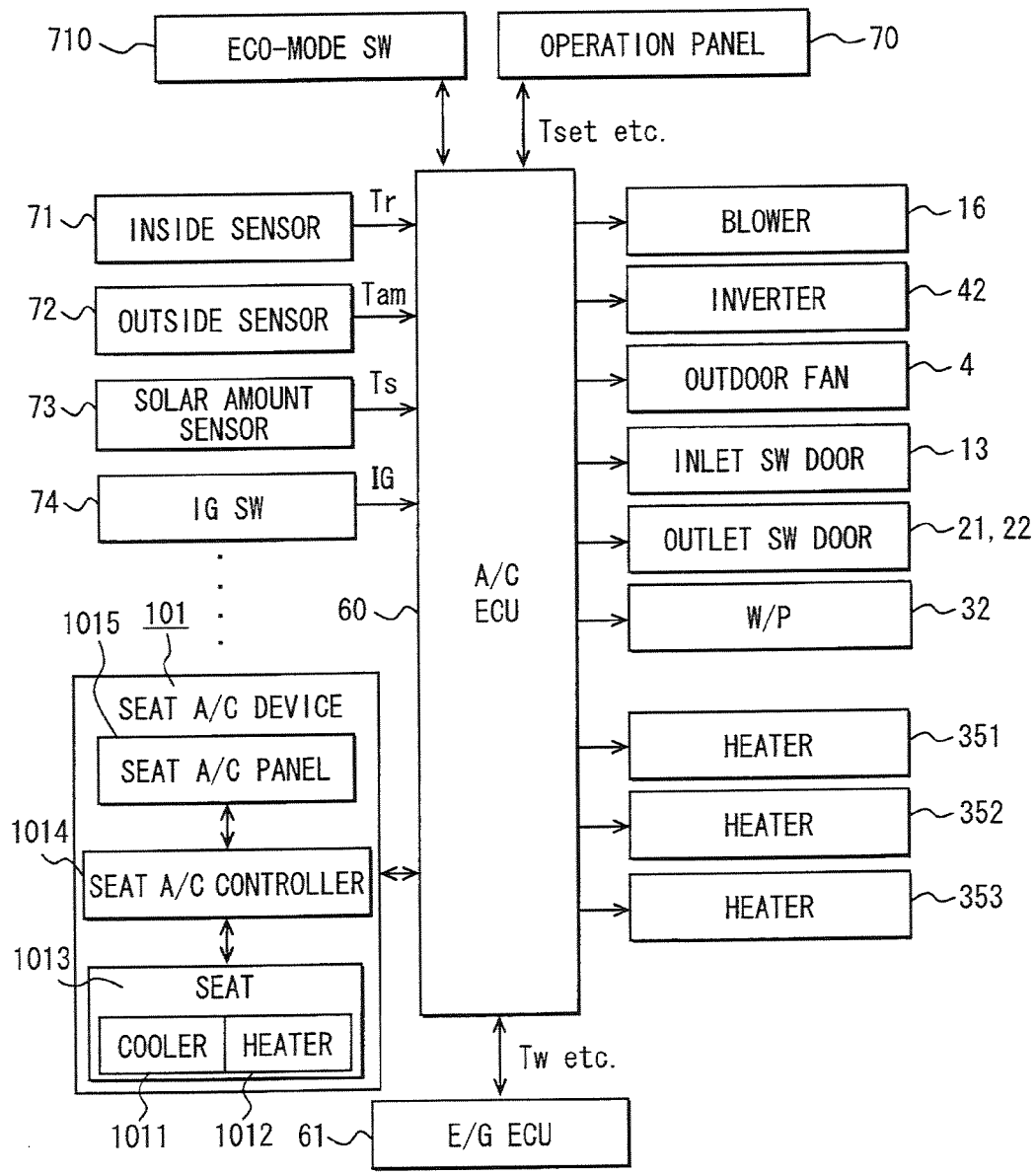
FIG. 3 is a schematic diagram illustrating an electric construction of the air-conditioner of the first embodiment.

An engine electronic control unit 61 (E/G ECU) shown in FIG. 3 and the hybrid ECU conduct the following controls.

(i) The engine 50 is basically stopped while the vehicle is stopped.

(ii) The driving force generated by the engine 50 is transmitted to the driving wheel while the vehicle is driving except for a slowdown time. The engine 50 is suspended, at the slowdown time, and power generated by the motor generator 51 charges the battery.

(iii) The driving forces generated by the motor generator 51 and the engine 50 are transmitted to the driving wheel when the vehicle has a large load at time of starting, acceleration, going up a hill or high speed driving.

(iv) The driving force of the engine 50 is transmitted to the motor generator 51, and the power generated by the motor generator 51 charges the battery, when the charge amount of the battery becomes lower than a target value.

(v) If the charge amount of the battery becomes lower than the target value while the vehicle is stopped, the engine ECU 61 receives a signal which starts the engine 50, and the driving force of the engine 50 is transmitted to the motor generator 51.

(vi) As shown in FIG. 3, a signal controlling a seat cooler 1011 or a seat heater 1012 is provided to a seat air-conditioning device 101 which corresponds to a seat temperature control system. The seat air-conditioning device 101 heats or cools a seat 1013 on which an occupant of the vehicle is seated. The seat cooler 1011 or the seat heater 1012 is arranged in the seat 1013 in a well-known manner. In addition, a seat air-conditioning controller 1014 is included in the seat air-conditioning device 101. A seat air-conditioning panel 1015 having a seat switch (not shown) is connected to the seat air-conditioning controller 1014, and supplies manipulate signals manipulating the seat air-conditioning device 101.

An air-conditioner 100 shown in FIG. 1 will be described. The air-conditioner 100 is mounted to the vehicle with the water-cooled engine 50, and has an air-conditioning unit which air-conditions inside of a passenger compartment of the vehicle. The air-conditioning unit is controlled by an air-conditioner electronic control unit 60 (A/C ECU) shown in FIG. 3. The air-conditioner 100 is used as what is called an auto air-conditioner. The air-conditioner 100 air-conditions inside of the passenger compartment by controlling refrigerant flow of a refrigerating cycle 1 and start of the engine 50. Moreover, the air-conditioner ECU 60 may correspond to a controller together with the seat air-conditioning controller 1014.

The air-conditioning unit is arranged ahead in the passenger compartment, and has an air-conditioning case 10 through which air passes. The air-conditioning case 10 has air inlets 11, 12 and air outlets on the opposite side opposite from the air inlets 11, 12. Air goes to the passenger compartment through the air outlets. The air-conditioning case 10 further has an air passage 10a through which air passes from the air inlets 11, 12 to the air outlets. A blower unit 14 is arranged in the case 10, on the upstream side adjacent to the air inlets 11, 12.

The blower unit 14 (blower used for air-conditioning) includes an inlet switch mechanism (door) 13 and a blower 16. The door 13 is driven with an actuator such as servo motor, and may correspond to an air inlet switching portion which changes opening degree of the air inlets 11, 12.

The air-conditioning unit is placed at the center position in the left-and-right direction of the vehicle, under an instrument board ahead in the passenger compartment. The blower unit 14 is located on the front side of the air-conditioning unit. The air inlet 11 of the blower unit 14 draws air inside of the passenger compartment.

The blower 16 is a centrifugal type fan generating air flow going toward the passenger compartment in the air-conditioning case 10. The blower 16 is driven to rotate by a blower motor 15 which is controlled by a blower drive circuit (not shown). The blower 16 changes an amount of conditioned-air blown off from the air outlets toward the passenger compartment.

An evaporator 7 and a heater core 34 are arranged in the air-conditioning case 10, and may correspond to a heat exchanger for air-conditioning (air-conditioning part) which heats or cools air sent by the blower unit 14, then the conditioned-air is sent to the air outlets. The evaporator 7 may be a cooling heat exchanger which controls the temperature of the conditioned-air passing through the case 10 toward the passenger compartment, using refrigerant.

The heater core 34 is located downstream of the evaporator 7 in the air flow direction, and may correspond to a heating heat exchanger, in which heat is exchanged between the air passing through the air passage 10a and cooling water of the engine 50, thereby heating the air. The cooling water circulates in a cooling water circuit 31 due to an electric water pump 32, and is warmed by a water jacket of the engine 50. A radiator (not shown), a thermostat (not shown), and the heater core 34 are disposed in the circuit 31.

The temperature of the cooling water becomes high after cooling the engine 50, and the high-temperature cooling water flows through the heater core 34. The heater core 34 reheats the air cooled by the evaporator 7 using the high-temperature cooling water as a heat source for heating. The heater core 34 is placed in the air-conditioning case 10 to block a part of the air passage 10a, and is located downstream of the evaporator 7.

An air mix (mixing) door 17 is located upstream of the heater core 34 in the air flow direction, and is used for controlling the temperature in the passenger compartment. The air mix door 17 is driven by an actuator such as servo motor. Moreover, the air mix door 17 changes the blow-off temperature of the conditioned-air which is blown off from each air outlet toward the passenger compartment. In other words, the air mix door 17 is an air mix portion which controls the ratio of the air passing through the evaporator 7 to the air passing through the heater core 34.

The evaporator 7 is one of components constructing the refrigerating cycle 1. The refrigerating cycle 1 includes a compressor 41 which draws, compresses and discharges refrigerant. The compressor 41 is driven by an electric motor 43 into which three-phase alternating current is input from an inverter 42 after converting a direct current of the battery into the three-phase alternating current with the inverter 42. The refrigerating cycle 1 further includes a condenser 3, a receiver 5, an expansion valve 6 in addition to the evaporator 7 and the compressor 41. The condenser 3 condenses refrigerant, which is discharged from the compressor 41, into liquid state. The receiver 5 separates the liquid refrigerant flowing from the condenser 3 into gas state and liquid state. The expansion valve 6 adiabatically expands the liquid refrigerant flowing from the receiver 5. The evaporator 7 evaporates the two-phase (gas and liquid) refrigerant flowing from the expansion valve 6.

When the rotation power of the electric motor 43 is transmitted to the compressor 41, the evaporator 7 cools air. When the rotation of the electric motor 43 is stopped, the discharge of the refrigerant by the compressor 41 is stopped, and the cooling of air conducted by the evaporator 7 is suspended. Moreover, the battery is charged with the electric power of the motor generator 51. Therefore, the compressor 41 driven with the electric motor 43 constructs a compression portion of an electrically-driven compressor (41, 42, 43) which obtains electric power from the motor generator 51. The condenser 3 is placed at a position easy to receive the running wind produced when the vehicle (hybrid car) runs. The condenser 3 may construct an outdoor heat exchanger in which the refrigerant flowing inside exchanges heat with outside air ventilated with an outdoor fan 4 and the running wind.

The air outlets are located at the most downstream part in the air-conditioning case 10. A defroster duct 23 connects a defroster outlet of the air outlets to a defroster opening 18, which is open at the most downstream end of the defroster duct 23. The defroster opening 18 mainly blows off warm air toward an inner surface of a front windshield 49 of the vehicle.

A face duct 24 connects a face outlet of the air outlets to a face opening 19, which is open at the most downstream end of the face duct 24. The face opening 19 mainly blows off cool air toward a face and an upper body of an occupant of the vehicle. A foot duct 25 connects a foot outlet of the air outlets to a foot opening 20, which is open at the most downstream end of the foot duct 25. The foot opening 20 mainly blows off warm air toward a foot of the occupant.

Two outlet switching doors 21, 22 are rotatably mounted on inner side of the outlets, and driven by actuator such as servo motor, so as to change the air outlet mode to any one of face mode, bilevel mode, foot mode, foot defroster mode, and defroster mode.

Figure 2:
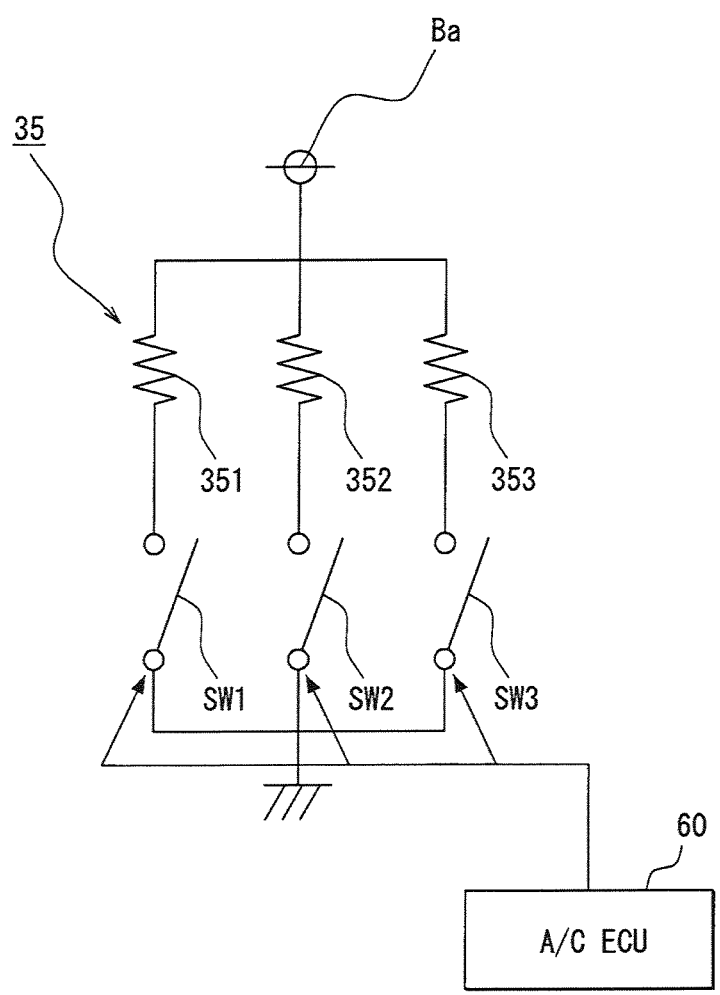
FIG. 2 is a schematic diagram illustrating an electric heater of the air-conditioner of the first embodiment.

An electric heater 35 is arranged downstream of the heater core 34 in the air flow direction, and may correspond to an auxiliary heating equipment which heats the air using a heat source other than the waste heat of the engine 50. The electric heater 35 heats the warm air which passed through the heater core 51. As shown in FIG. 2, the electric heater 35 has heater wires 351, 352, 353 which are made of PTC or Nichrome resistor, which are connected in parallel with each other between a power source Ba and the ground.

Switch elements SW1, SW2, SW3 are provided to the heater wires 351, 352, 353, respectively. When the switch element SW1, SW2, SW3 is turned on, electricity is supplied to the heater wire 351, 352, 353 from the power source Ba. When the switch element SW1, SW2, SW3 is turned off, the electricity supply is stopped. The switch element SW1, SW2, SW3 is turned on or off by the air-conditioner ECU 60 of FIG. 3.

Electric construction of the air-conditioner 100 will be described with reference to FIG. 3. The air-conditioner ECU 60 may correspond to a controller together with the seat air-conditioning controller 1014. Ignition (IG) signal is output when an ignition switch 74 (FIG. 3) is turned on. The engine 50 (FIG. 1) is started or stopped by the ignition switch 74. When the ignition (IG) signal is output, the battery (in-vehicle power source, not shown) supplies direct current to the air-conditioner ECU 60 and the seat air-conditioning controller 1014 so as to start computing and processing.

A communication signal is output from the engine ECU 61 to the air-conditioner ECU 60. A switch signal is output from each switch on the operation panel 70 arranged on the front face of the passenger compartment to the air-conditioner ECU 60. A sensor signal is output from each sensor to the air-conditioner ECU 60. The engine ECU 61 may be referred as fuel-injection ECU.

Figure 5:
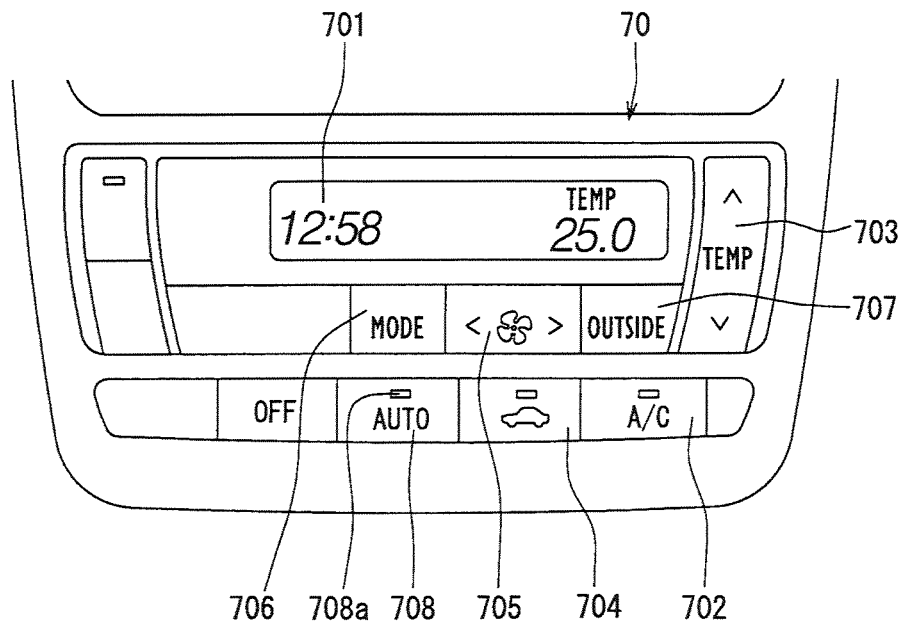
FIG. 5 is a front view illustrating an operation panel of the air-conditioner of the first embodiment.
Figure 6:
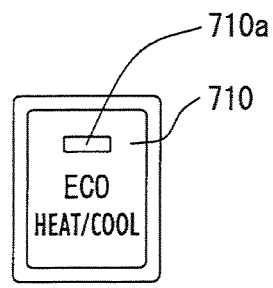
FIG. 6 is a front view illustrating an eco-mode switch of the air-conditioner of the first embodiment.

An operation system including the operation panel 70 is explained with reference to FIGS. 5 and 6. FIG. 5 is a front view illustrating the operation panel 70. FIG. 6 is a front view illustrating an eco-mode switch 710 prepared in the instrument panel of the vehicle. The eco-mode switch 710 is connected to the air-conditioner ECU 60 and is used for setting an eco-mode to save energy (power), for example, in the operation of the compressor 41. The eco-mode operation is set when the eco-mode switch 710 is pushed once. If the eco-mode switch 710 is pushed once again, non-eco-mode operation is set (eco-mode-off). These operations are repeated whenever the eco-mode switch 710 is pushed.

The operation panel 70 is connected to the air-conditioner ECU 60 of FIG. 3, and the air-conditioner 100 is operated through the operation panel 70. As shown in FIG. 5, the operation panel 70 is disposed in the instrument panel of the vehicle, and an occupant who is seated on the front seat can operate the operation panel 70.

The operation panel 70 has a display 701, an A/C switch 702, a temperature setting switch 703, an air inlet setting switch 704, a blower switch 705, a mode switch 706, an outside air temperature display switch 707 and the like. The display 701 displays various kinds of information. The air-conditioner 100 is activated or stopped by the A/C switch (operation switch) 702. The temperature setting switch 703 is used for setting (raising or lowering) a preset temperature. The air inlet setting switch 704 is used for manually selecting the air inlet mode between an inside air mode and an outside air mode. The blower switch 705 is used for setting (increasing or decreasing) the amount of the conditioned air. The mode switch 706 is used for selecting the air outlet which blows off the conditioned-air. A temperature of the outside air is displayed when the outside air temperature display switch 707 is turned on. In addition, the blower switch 704 corresponds to a switch starting the air-conditioning. When the blower switch 704 is turned on, a signal instructing the air-conditioning is transmitted to the air-conditioner ECU 60.

It becomes possible to start or stop the air-conditioning operation, to switch the air inlet mode between the inside air mode and the outside air mode, to set the preset temperature, the air amount and the air outlet mode, with looking at the display 701, for the air-conditioner 100. The air-conditioner ECU 60 enables the air-conditioning operation which is based on the setting conducted on the operation panel 70.

The operation panel 70 further has an auto (AUTO) switch 708. When the auto switch 708 is turned on, the air-conditioner ECU 60 automatically sets the target blow off temperature, the air amount, the air outlet mode, etc. based on the preset temperature, the temperature in the passenger compartment, the outside air temperature, the solar amount, etc. in a manner that the temperature in the passenger compartment agrees with the preset temperature. That is, the air-conditioner ECU 60 sets the target blow off temperature based on the preset temperature, the environmental condition, etc., and sets the rotation number of the compressor 41 (rotation speed of the electric motor 43), the opening of the air mix door 17, etc. so as to obtain the set target blow off temperature. Further, the air-conditioner ECU 60 selects the air outlet and sets the blow-off air amount (blower air amount).

Thus, the temperature in the passenger compartment is maintained to agree with the preset temperature by performing the automatic air-conditioning operation based on the setting. Moreover, if the outside air temperature display switch 707 is operated, an outside air temperature Tam detected by an outside air temperature sensor 72 (FIG. 3) is displayed on the display 701.

The air-conditioner ECU 60 is connected to the engine ECU 61 and the hybrid ECU. For example, when an engine-cooling-water temperature Tw detected by a cooling-water-temperature sensor has not reached a predetermined temperature, the air-conditioner ECU 60 requires that the engine 50 is turned on (engine-on-demand). Therefore, the engine 50 is driven to raise the engine-cooling-water temperature Tw, thereby enabling the heater core 34 to conduct the heating operation sufficiently. Moreover, fuel can be saved by stopping the engine 50.

In the air-conditioner 100, the eco-mode (economy mode, energy-saving mode) can be set to save the energy. Specifically, in the air-conditioner 100, operation mode is selected between the eco-mode which gives priority to the energy-saving effect and an auto mode which gives priority to the comfortableness in the passenger compartment.

The eco-mode switch 710 is connected to the air-conditioner ECU 60, and is used for selecting the eco-mode or not as a selecting portion. As shown in FIG. 6, the eco-mode switch 710 is located at a specified position of the instrument panel operatable by an occupant. Moreover, the eco-mode switch 710 is turned on and off by pressing or touching the switch 710, so as to switch the mode between the eco-mode and the non-eco-mode (eco-mode-off). When the eco-mode is selected, a light emitting diode of an eco-mode display part 710a emits light.

The air-conditioner ECU 60 includes a well-known microcomputer (not shown) with CPU (central processing unit) which performs computing and processing, memory such as ROM or RAM, and I/O port (input/output circuit).

A sensor signal output from a sensor has A/D conversion by the I/O port or A/D conversion circuit, and the converted signal is input into the microcomputer. The air-conditioner ECU 60 is connected with an inside air temperature sensor 71, an outside air temperature sensor 72, a solar amount sensor 73 and the ignition switch 74. The inside air temperature sensor 71 detect an inside air temperature Tr around a driver's seat of the vehicle. The outside air temperature sensor 72 detects the outside air temperature Tam (outdoor air temperature) outside of the passenger compartment. The solar amount sensor 73 detects the solar amount Ts outside of the passenger compartment. The ignition switch 74 (start-up switch) is operated to start the vehicle. The IG signal is input into the air-conditioner ECU 60 when the ignition switch 74 is turned on.

Moreover, the air-conditioner ECU 60 is connected with an after-eva temperature sensor and a humidity sensor (not shown in FIG. 3). The after-eva temperature sensor detects a temperature of air immediately after passing through the evaporator 7 (as an after-eva temperature TE). The humidity sensor detects a relative humidity in the passenger compartment.

The cooling-water-temperature sensor (not shown) detects the engine-cooling-water temperature Tw of the vehicle, and is connected to the engine ECU 61. The air-conditioner ECU 60 acquires the engine-cooling-water temperature Tw through the engine ECU 61. Moreover, the inside air temperature sensor 71, the outside air temperature sensor 72, the after-eva temperature sensor, and the cooling-water-temperature sensor may be made of thermo element such as a thermistor, for example.

Furthermore, the solar amount sensor 73 has a solar amount level detector detecting the solar amount level irradiated into the passenger compartment, and may be constructed by a photodiode, for example. The humidity sensor and the inside air temperature sensor 71 are accommodated in a recess formed in the front face of the instrument panel near the driver's seat, and are used for determining whether the defroster mode is set for defrosting the front windshield 49 (FIG. 1).

Figure 4:
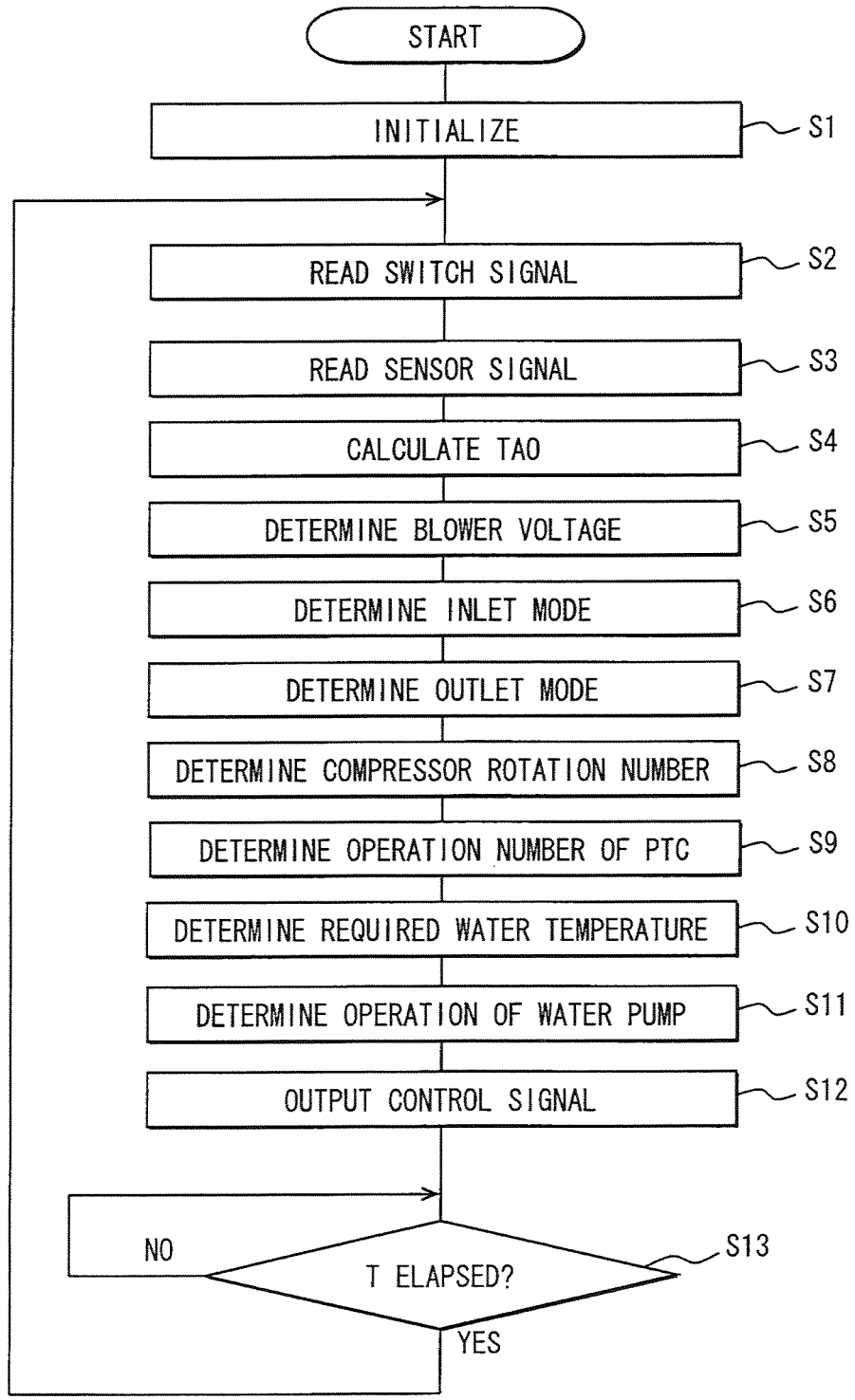
FIG. 4 is a flow chart illustrating a fundamental control process performed by an air-conditioning ECU of the air-conditioner of the first embodiment.

Operations conducted by the air-conditioner ECU 60 will be described with reference to FIG. 4. FIG. 4 is a flow chart illustrating an example of control process performed by the air-conditioner ECU 60. First, if the ignition switch 74 is turned on, for example, by the driver to switch the parked state to the drivable state, a direct current power source is supplied to the air-conditioner ECU 60, and the control program beforehand memorized in the memory will be executed.

At S1, the contents of the memory in the microcomputer of the air-conditioner ECU 60 are initialized, and the air-conditioner ECU 60 moves to S2. At S2, the switch signal is read from the various operation switches including the eco-mode switch 710 of FIG. 6.

At S3, the sensor signal is read from the various sensors, and the air-conditioner ECU 60 moves to S4. In S2 and S3, various data are read into the memory for processing data. The sensor signal may be the inside air temperature Tr detected by the sensor 71, the outside air temperature Tam detected by the sensor 72, the solar amount Ts detected by the sensor 73, the after-eva temperature Te detected by the after-eva temperature sensor, and the engine-cooling-water temperature Tw detected by the cooling-water-temperature sensor.

At S4, the target blow off temperature TAO is calculated by inputting the data into the following Expression 1 memorized in advance, and the air-conditioner ECU 60 moves to S5.

$$TAO = Kset \times Tset - Kr \times Tr - Kam \times Tam - Ks \times Ts + C \quad \text{(Expression 1)}$$

Here, Tset represents the preset temperature set with the temperature setting switch. Tr represents the inside air temperature. Tam represents the outside air temperature. Ts represents the solar amount. Values of Kset, Kr, Kam and Ks are gains, and a value of C is a correcting constant for the whole of Expression 1. A control value of the actuator of the air mix door 17 and a control value of the rotation speed of the water pump 32 are computed by using the TAO value and the signal output from the sensor.

At S5, the blower voltage is determined. The blower voltage is a voltage applied to the blower motor 15, and the blow-off air amount is changed according to the blower voltage. Details of S5 are mentioned later.

At S6, the air inlet mode is determined based on the target blow off temperature TAO by executing a process for determining the air inlet mode. Thus, the air inlet from which air is drawn into the air-conditioning case 10 is determined, and the air-conditioner ECU 60 moves to S7. Details of S6 are mentioned later.

At S7, the air outlet mode is determined based on the target blow off temperature TAO by executing a process for determining the air outlet mode to be described below. Thus, the air outlet from which the conditioned-air is blown off to the passenger compartment is determined, and the air-conditioner ECU 60 moves to S8. For example, the air outlet mode may be set based on a map memorized in the ROM so as to correspond to the target blow off temperature TAO.

At S8, a process for determining the compressor rotation speed to be described below is executed, and the air-conditioner ECU 60 moves to S9.

At S9, a process for determining the operation number of the PTC heater (electric heater) to be described below is executed.

At S10, a process for determining the required temperature of the engine cooling water to be described below is executed based on the target blow off temperature TAO etc. in order to use the engine cooling water as heat source for heating and defrosting, and the air-conditioner ECU 60 moves to S11. Details of S10 are mentioned later.

At S11, a process for determining the operation of the water pump is executed based on the engine-cooling-water temperature Tw etc. so as to turn on or off the electric water pump 32 (FIG. 1), and the air-conditioner ECU 60 moves to S12. Details of S11 are mentioned later.

At S12, a control signal is output to the actuator, such that each control state computed or determined at S4-S11 is acquired, and the air-conditioner ECU 60 moves to S13. At S12, the display of the eco-mode and the auto mode is also controlled.

Moreover, at S12, a signal in connection with the target blow off temperature TAO computed at S4 is sent to the seat air-conditioning controller 1014 in the seat air-conditioning device 101. Moreover, the operation information of the eco-mode switch read at S2 is transmitted to the seat air-conditioning controller 1014 in the seat air-conditioning device 101, so as to report whether the air-conditioner 100 is operating with the eco-mode or the non-eco-mode. Moreover, the state information (ON or OFF) of the ignition switch 74, and the operation information of the auto switch 708 are also transmitted to the seat air-conditioning controller 1014 in the seat air-conditioning device 101 from the air-conditioner ECU 60, so as to report whether the air-conditioner 100 is operating with the manual mode or the auto mode.

The following control is performed in the seat air-conditioning controller 1014 of the seat air-conditioning device 101. At the time of eco-mode, the seat air-conditioning device 101 is automatically operated with a seat auto mode. Specifically, the seat heater 1012 is turned on immediately after the eco-mode is set, so an occupant of the vehicle is restricted from feeling cold even when a target temperature of the air-conditioner 100 is set lower at the eco-mode.

As shown in FIG. 3, the seat air-conditioning device 101 has the seat heater 1012 and the seat air-conditioning panel 1015. The seat heater 1012 heats the seat 1013 using electric heater. The seat air-conditioning panel 1015 has a seat heater switch (hereinafter referred as seat SW) which controls the seat heater 1012. Moreover, the seat air-conditioning device 101 operates in a seat manual mode or the seat auto mode. At the seat manual mode, the temperature of the seat 1013 is gradually (stepwise) controlled by manually operating the seat heater switch of the seat air-conditioning panel 1015.

Figure 7:
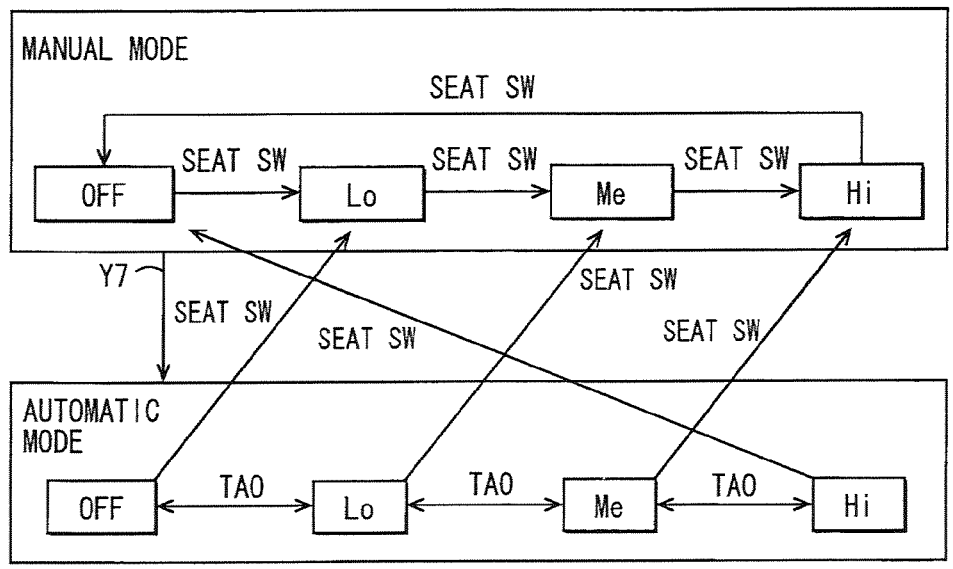
FIG. 7 is an explanatory view illustrating a mode shift in a seat conditioning device of the air-conditioner of the first embodiment.

As shown in FIG. 7, the seat manual mode of the seat air-conditioning device 101 has a manual-OFF, a manual-Lo, a manual-Me, and a manual-Hi, which are set in order of the temperature from low to high. The seat air-conditioning device 101 receives a signal of the target blow off temperature TAO from the air-conditioner ECU 60.

When the seat air-conditioning device 101 is set in the seat auto mode by the seat auto switch of the seat air-conditioning panel 1015, the temperature of the seat 1013 is changed according to the target blow off temperature TAO. When the seat heater 1012 operates with the seat auto mode, the mode is changed in order of an auto-OFF, an auto-Lo, an auto-Me, and an auto-Hi, which are set in order of the temperature from low to high.

In FIG. 7, when the seat air-conditioning device 101 is set in the seat manual mode, the seat heater 1012 is changed in order of the manual-OFF, the manual-Lo, the manual-Me, and the manual-Hi by every operating the seat heater switch of the seat air-conditioning panel 1015.

Figure 8:
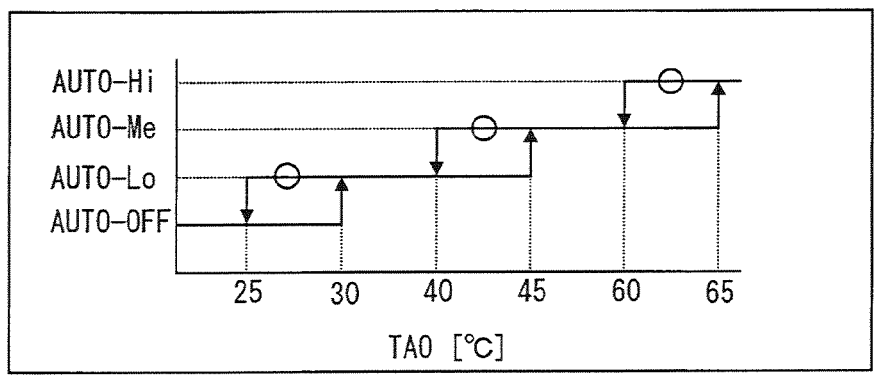
FIG. 8 is a graph illustrating a relationship between a target blow-off temperature and a seat mode in the air-conditioner of the first embodiment.

For example, at the time of the manual-OFF, if the eco-mode switch 710 of FIG. 6 is operated to change the air-conditioner 100 from the non-eco-mode to the eco-mode, the control state is shifted as shown in an arrow direction Y7 of FIG. 7. Thereby, the operation of the seat air-conditioning device 101 is changed to the seat auto mode, in which the auto-OFF, the auto-Lo, the auto-Me or the auto-Hi is automatically selected based on the target blow off temperature TAO, as shown in FIG. 8.

While the seat air-conditioning device 101 is operated with the seat auto mode, if the seat heater switch (seat SW) of the seat air-conditioning panel 1015 is operated, the mode is shifted from the auto-OFF to the manual-Lo, from the auto-Lo to the manual-Me, from the auto-Me to the manual-Hi, or from the auto-Hi to the manual-OFF.

The shifting state in the seat auto mode is also shown in FIG. 7. Every time when a signal is received from the air-conditioner ECU 60, the mode is shifted automatically in order of the auto-OFF, the auto-Lo, the auto-Me, and the auto-Hi according to the target blow off temperature TAO, as shown in FIG. 8. The temperature of the seat heater 1012 becomes low in order of Hi, Me and Lo.

Figure 9:
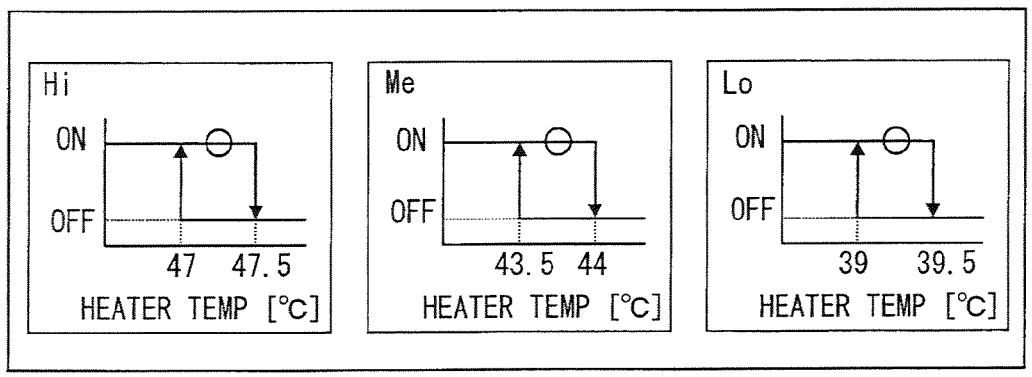
FIG. 9 is a graph illustrating temperature control of a seat heater in each operation state in the air-conditioner of the first embodiment.

Left graph of FIG. 9 illustrates a relationship between the temperature of the seat heater 1012 (heater temperature) and ON or OFF of the seat heater 1012, at the mode of auto-Hi and manual-Hi. The heater temperature represents a target temperature (° C.) of the seat heater 1012 at each mode. Thus, at the time of the manual-Hi and the auto-Hi, when the temperature of the seat heater 1012 becomes 47° C., the seat heater 1012 is turned on. In contrast, when the temperature of the seat heater 1012 becomes 47.5° C., the seat heater 1012 is turned off. The seat heater 1012 is turned on or off with the hysteresis. The control is started from an operating state indicated by a circle mark in FIG. 9 at the control start time.

Center graph of FIG. 9 illustrates a relationship between the temperature of the seat heater 1012 (heater temperature) and ON or OFF of the seat heater 1012, at the mode of auto-Me and manual-Me.

Right graph of FIG. 9 illustrates a relationship between the temperature of the seat heater 1012 (heater temperature) and ON or OFF of the seat heater 1012, at the mode of auto-Lo and manual-Lo.

When the air-conditioner 100 is switched from the non-eco-mode to the eco-mode to reduce the power of the compressor 41 by operating the eco-mode switch 710, the target temperature in the passenger compartment is set lower. At the moment setting the eco-mode, as shown in FIG. 7, the seat air-conditioning device 101 is automatically set into the seat auto mode. As a result, the temperature of the seat heater 1012 is promptly and optimally controlled according to the target blow off temperature TAO, as shown in FIG. 8. Therefore, the occupant can be restricted from feeling cold.

The above explanation is conducted as to the operation of the seat heater 1012 of the seat air-conditioning device 101. The seat air-conditioning device 101 is further equipped with the seat cooler 1011 made of, for example, Peltier element, and the same control is possible also for the seat cooler 1011. The air-conditioner 100 may be switched from the non-eco-mode to the eco-mode to reduce the power of the compressor 41 by operating the eco-mode switch 710 when the seat cooler 1011 is operated in summer. At the moment setting the eco-mode to increase the target temperature in the passenger compartment, the seat air-conditioning device 101 is set into the seat auto mode, similarly to FIG. 7. As a result, the temperature of the seat cooler 1011 is promptly and optimally controlled according to the target blow off temperature TAO to cool the occupant, so the occupant can be restricted from feeling uncomfortable to the minimum.

At S13 of FIG. 4, when a predetermined time T is elapsed, S2 is restarted.

Next, each control conducted by the air-conditioner ECU 60 is explained in more detail.

Figure 10:
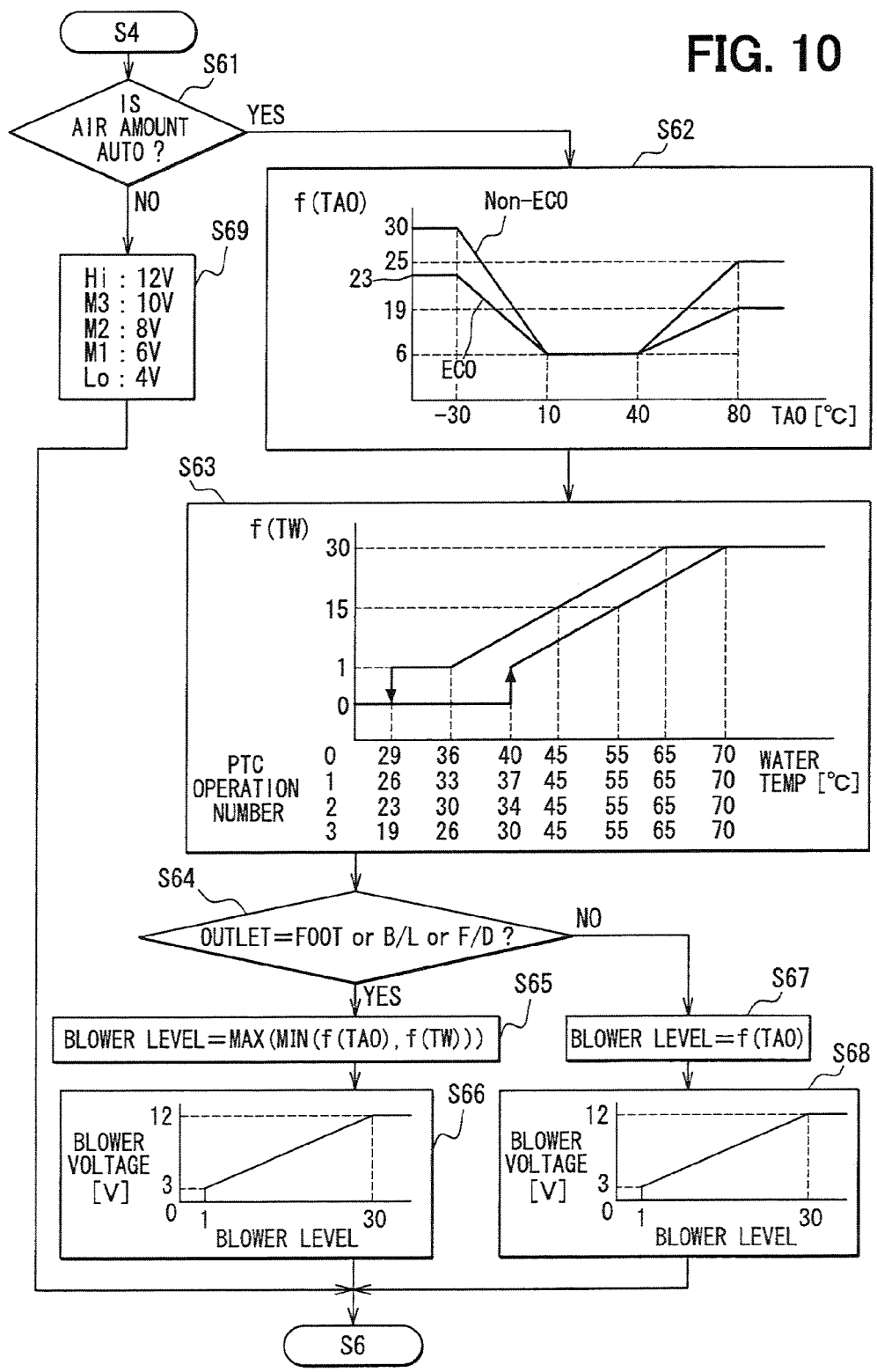
FIG. 10 is a flow chart illustrating a process for determining a blower voltage in the air-conditioner of the first embodiment.

First, the blower voltage determination process (S5) is explained. Specifically, S5 is performed based on FIG. 10. The blower voltage is a voltage applied to the blower motor 15 which is driven with power supplied from the battery. As shown in FIG. 10, it is determined whether the setting of the air amount is auto (automatic) at S61. When the setting of the air amount is auto, the air-conditioner ECU 60 moves to S62. When the setting of the air amount is not auto, the air-conditioner ECU 60 moves to S69.

At S62, a temporary blower level f(TAO), which will serve as a base, is calculated from a map. The blower level at the eco-mode is set lower than the blower level at the non-eco-mode. Thereby, power consumption of the blower is reduced, and the rise in the temperature of the evaporator 7 becomes late at a cooling operation time. In contrast, at a heating operation time, because the decrease in the temperature of the cooling water of the engine becomes late, energy required by the air-conditioner 100 can be reduced.

At S63, a warm-up air amount f(Tw) is computed according to the water temperature of the heater core 34 and the PTC operation number of the electric heater 35.

At S64, the air outlet mode is determined as the foot mode (FOOT), the bilevel mode (B/L), the foot defroster mode (F/D), or the other.

When the air outlet mode is determined as one of the foot mode (FOOT), the bilevel mode (B/L), and the foot defroster (F/D) mode, the air-conditioner ECU 60 progresses to S65.

At S65, it is determined which is larger between the minimum value of the temporary blower level f(TAO) and the warm-up air amount f(Tw), and the blower level is set by the larger one. At S66, the blower level selected at S65 is converted into a blower voltage using a map.

When the air outlet mode is determined as the other at S64, for example when the air outlet mode is set only at the face mode (FACE), the air-conditioner ECU 60 progresses to S67. At S67, the temporary blower level f(TAO) is selected as a blower level. At S68, the selected blower level f(TAO) is converted into a blower voltage using a map.

When the setting of the air amount is manual at S61, voltage (from 4V to 12V) is applied to the blower motor 15 based on a map at S69.

Figure 11:
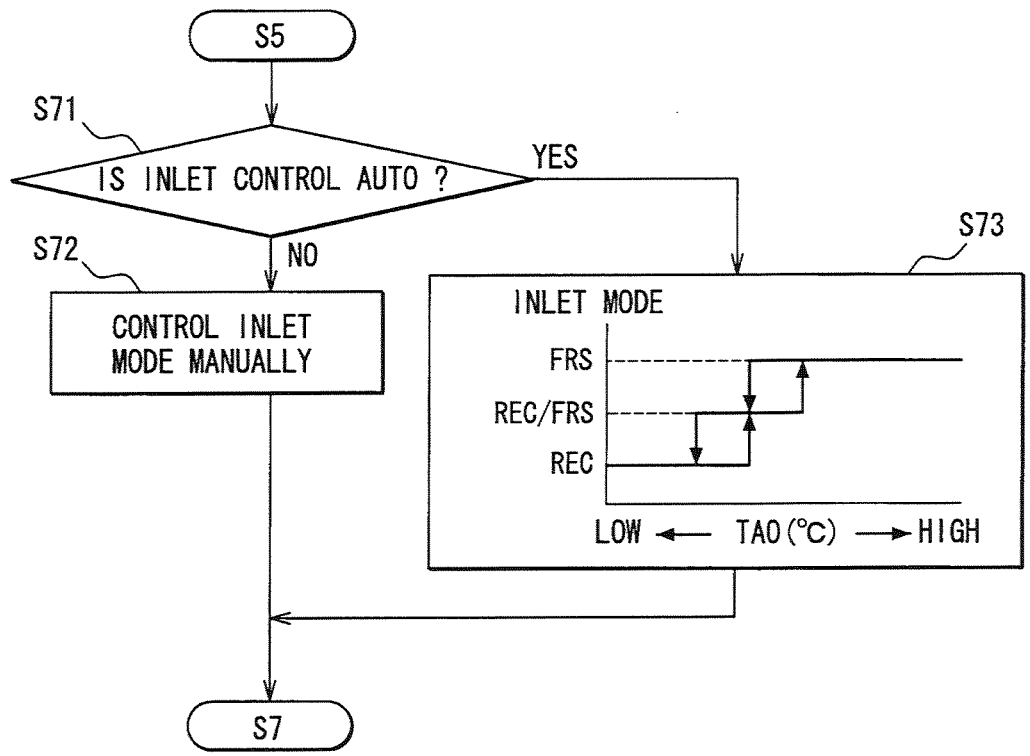
FIG. 11 is a flow chart illustrating a process for determining an air inlet mode in the air-conditioner of the first embodiment.

Next, the air inlet mode determination process (S6) is explained based on FIG. 11. As shown in FIG. 11, at S71, it is determined whether the air inlet control is auto or not. When the air inlet control is auto, the air inlet switch control is performed according to the target blow off temperature TAO at S73. When the air inlet control is manual, the air inlet control is performed according to the manual setting at S72. That is, the outside air introduction rate is set as 0% at the time of inside air mode (REC), or is set as 100% at the time of outside air mode (FRS).

Figure 12:
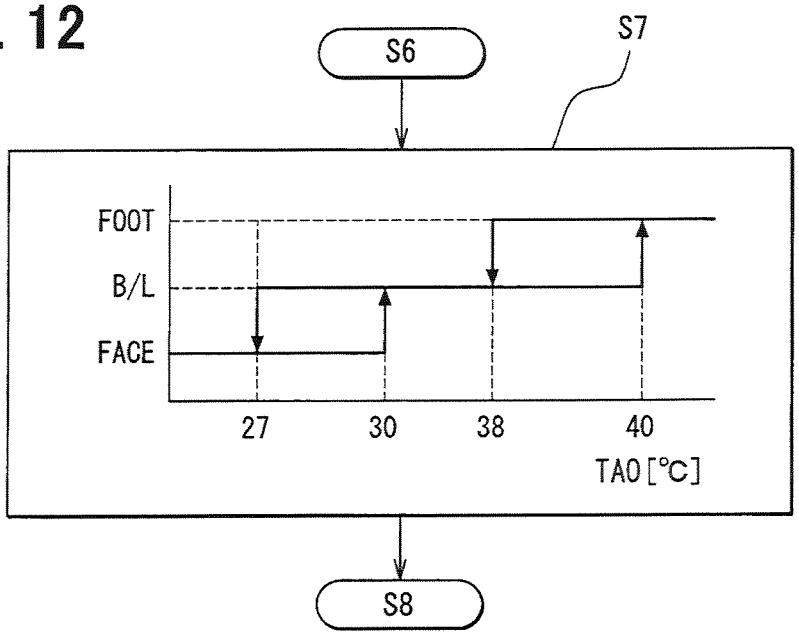
FIG. 12 is a flow chart illustrating a process for determining an air outlet mode in the air-conditioner of the first embodiment.

Next, the air outlet mode determination process (S7) is explained based on FIG. 12. As shown in FIG. 12, the air outlet mode is determined as one of the face mode (FACE), the bilevel mode (B/L) and the foot mode (FOOT) according to the target blow off temperature TAO.

Figure 13:
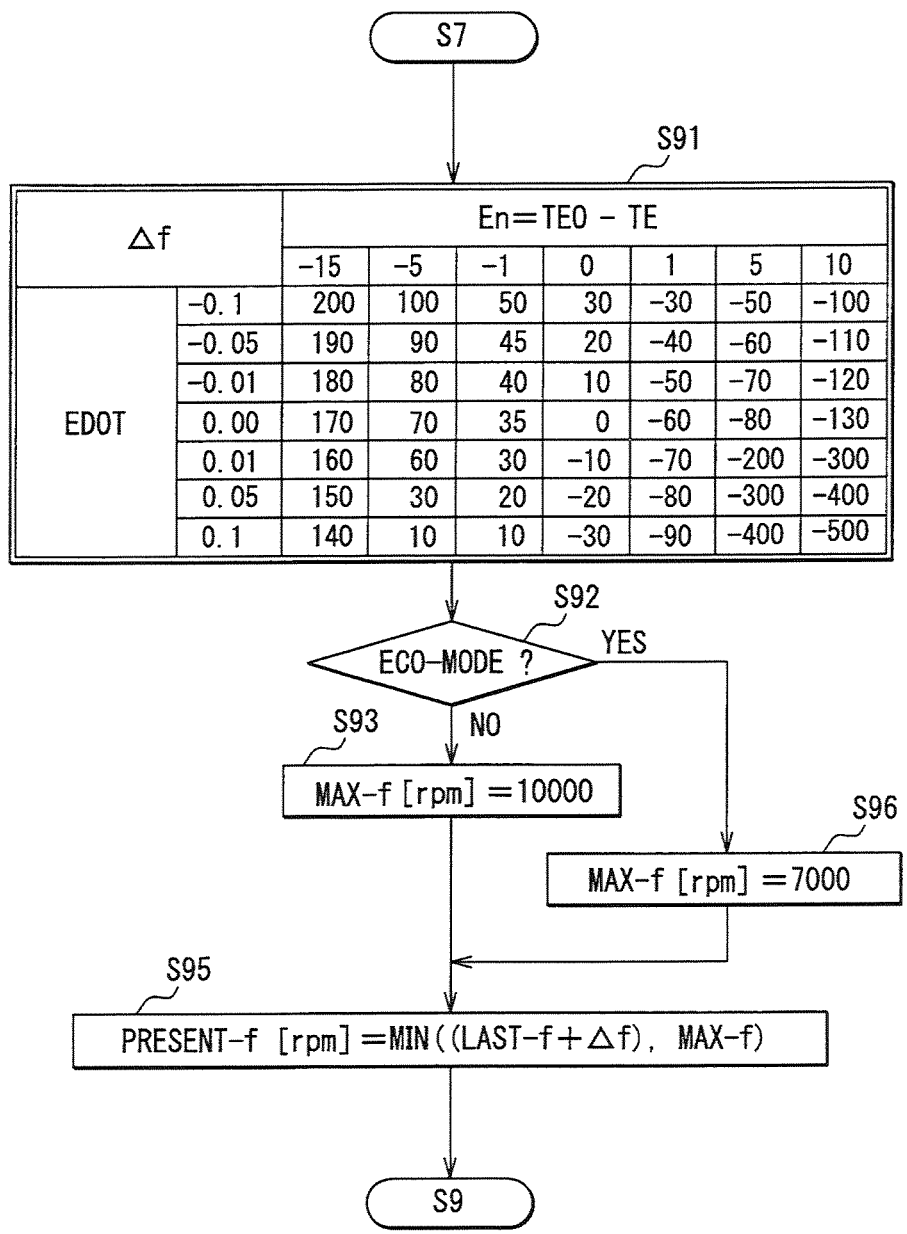
FIG. 13 is a flow chart illustrating a process for determining a compressor rotation speed in the air-conditioner of the first embodiment.

Next, the compressor rotation number determination process (S8) is explained based on FIG. 13. As shown in FIG. 13, at S91, a temperature deviation En is calculated, using the following Expression 2, by subtracting an actual after-eva temperature TE from a target after-eva temperature TEO computed using the detection signals of the sensors.

$$En = TEO - TE \quad \text{(Expression 2)}$$

Then, a deviation variation rate EDOT is calculated, using the Expression 3, and a rotation number variation $\Delta f$ of the compressor is calculated from a map example shown in FIG. 13. A value of En-1 represents a last time deviation value before a deviation En, and n is a natural number.

$$EDOT = En - En - 1 \quad \text{(Expression 3)}$$

The value of En is updated once per second, therefore the value of En−1 is a value one second ago relative to En.

The example map (example at the time of cooling operation) representing the relationship among the deviation En, the deviation variation rate EDOT and the rotation number variation $\Delta f$ is shown in S91 of FIG. 13. An increase/decrease rotation number variation $\Delta f$ is calculated relative to the one-second-before compressor rotation number fn−1 based on the map memorized in the ROM of the air-conditioner ECU 60 using En and EDOT.

Alternatively, the rotation number variation $\Delta f$ calculated based on the deviation En and the deviation variation rate EDOT may be calculated through a fuzzy control based on a predetermined membership function and rule memorized in the ROM. Thus, the rotation number variation $\Delta f$ is calculated every second for the compressor.

At S92, it is determined whether the eco-mode is set by turning on the eco-mode switch 710 of FIG. 6. When the eco-mode is not set at S92, the maximum rotation number MAX-f is set as 10000 rpm at S93. Then, at S95, it is determined whether the sum of the last rotation number LAST-f and the rotation number variation $\Delta f$ is smaller than the maximum rotation number MAX-f (10000 rpm). The value of the smaller one is set as the present time compressor rotation number PRESENT-f.

When the eco-mode is set at S92, the maximum rotation number MAX-f is set as 7000 rpm at S96.

Then, at S95, it is determined whether the sum of the last rotation number LAST-f and the rotation number variation $\Delta f$ is smaller than the maximum rotation number MAX-f (7000 rpm). The value of the smaller one is set as the present time compressor rotation number PRESENT-f.

The maximum rotation number MAX-f is set as 7000 rpm at the eco-mode, which is lower than 10000 rpm set at the non-eco-mode. In other words, the maximum rotation number is reduced in the eco-mode, so the power consumption of the compressor 41, 42, 43 can be reduced at the eco-mode.

Figure 14:
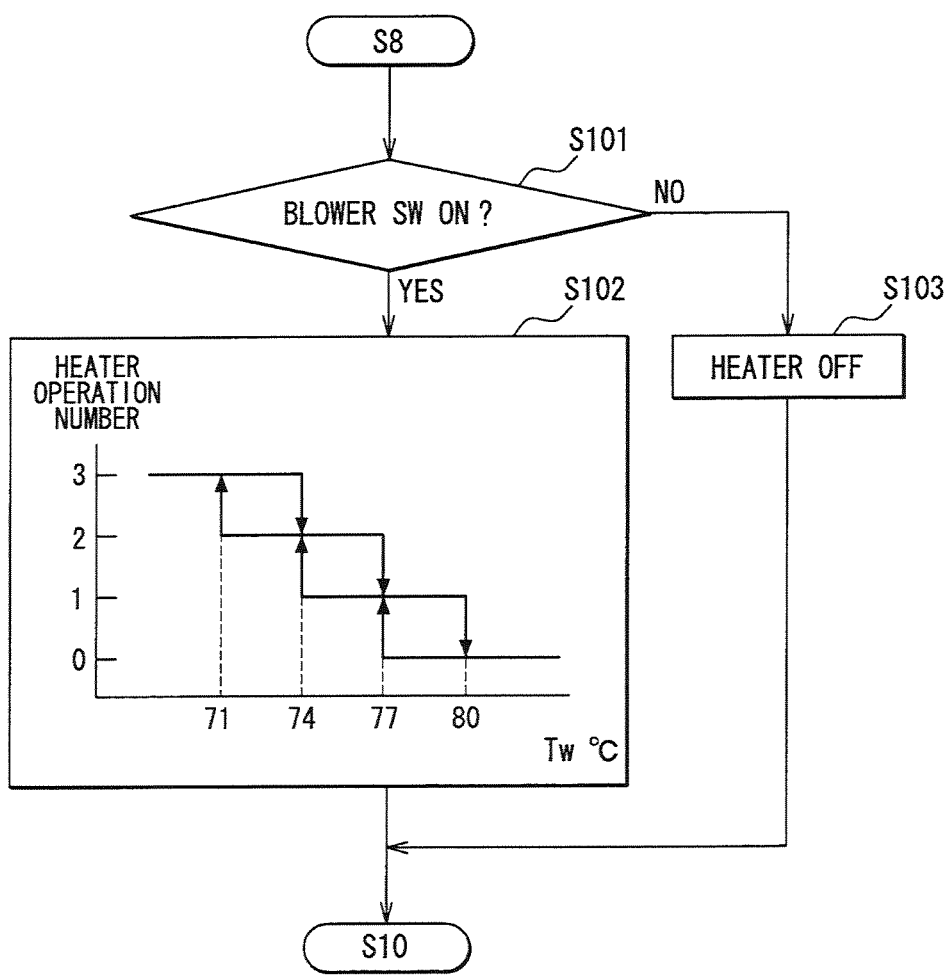
FIG. 14 is a flow chart illustrating a process for determining a PTC operation number in the air-conditioner of the first embodiment.

Next, the PTC operation number determination process (S9) is explained based on FIG. 14. As shown in FIG. 14, at S101, it is determined whether the blower switch 705 (FIG. 5) is set ON. Specifically, it is determined that the blower switch 705 is ON when AUTO, LO, ME, or HI is set for the air amount by operating the blower switch 705, other than OFF. When it is determined that the blower switch 705 is ON at S101, the operation number of the electric heater 35 is computed based on the engine-cooling-water temperature Tw, at S102.

Specifically, as shown in the characteristics map of FIG. 14, when the engine-cooling-water temperature Tw is lower than 71° C., the operation number of the electric heater 35 is set into three. When the engine-cooling-water temperature Tw is higher than or equal to 71° C. and is lower than 74° C., the operation number of the electric heater 35 is set into two. When the engine-cooling-water temperature Tw is higher than or equal to 74° C. and is lower than 77° C., the operation number of the electric heater 35 is set into one. When the engine-cooling-water temperature Tw is higher than or equal to 77° C., the operation number of the electric heater 35 is set into zero.

When it is determined that the blower switch 705 is OFF at S101, the electric heater 35 is set OFF (operation number is zero) at S103. After the operation number of the electric heater 35 is determined, the switch element SW1, SW2, SW3 of FIG. 2 is turned on or off based on the determination. Thus, the heat amount provided to air passing through the heater core 34 can be controlled by the operation number of the electric heater 35.

Figure 15:
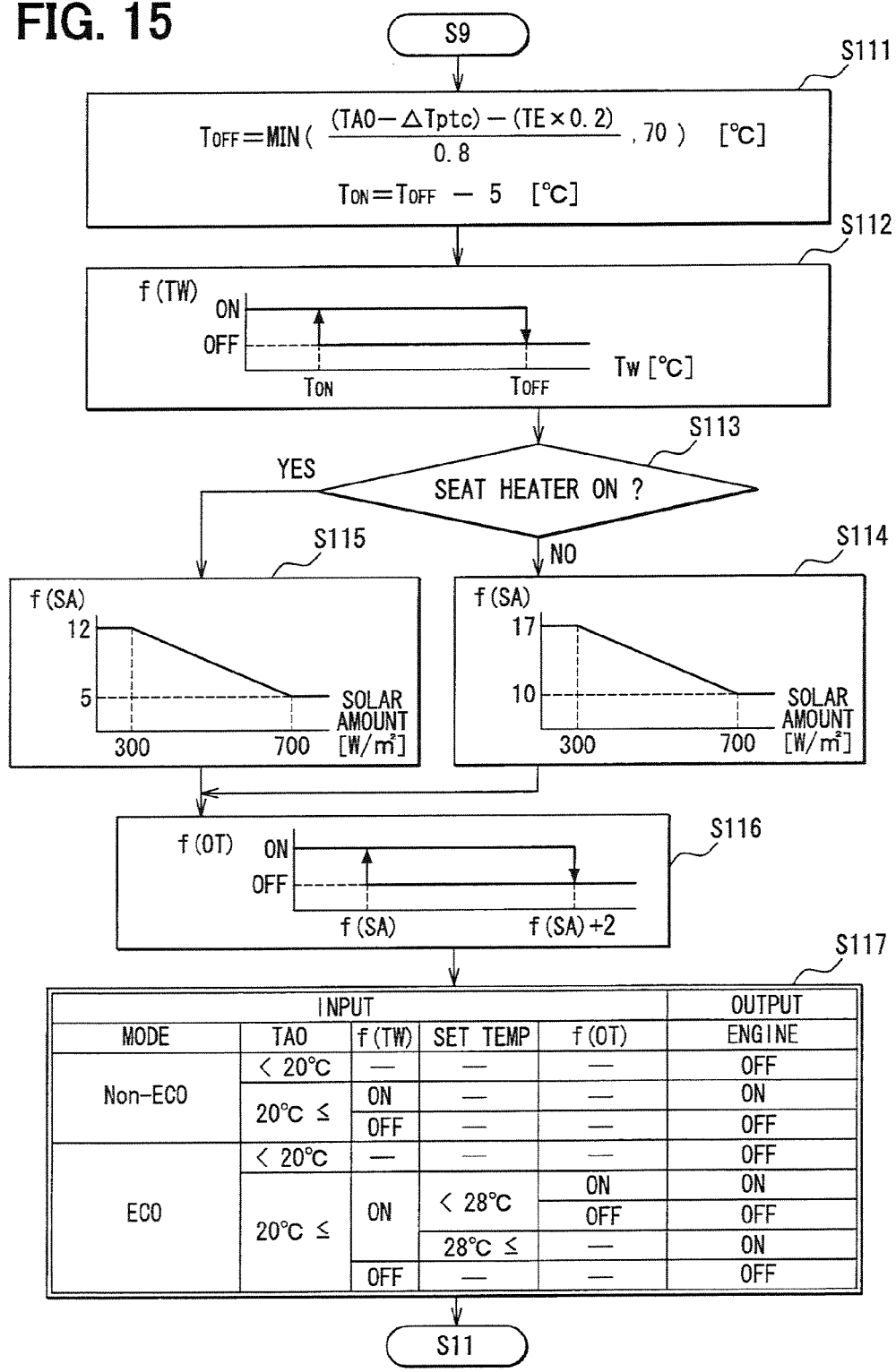
FIG. 15 is a flow chart illustrating a process for determining a required water temperature in the air-conditioner of the first embodiment.

Next, the required water temperature determination process (S10) is explained based on FIG. 15. FIG. 15 is a flow chart explaining details of the required water temperature determination process of FIG. 4.

As shown in FIG. 15, at S111, an engine-off water temperature Toff and an engine-on water temperature Ton are calculated, which are determination threshold value used for determining an engine-on demand based on the engine-cooling-water temperature. The engine-off water temperature Toff is a threshold temperature for stopping the engine 50, and the engine-on water temperature Ton is a threshold temperature for activating the engine 50.

A reference engine-cooling-water temperature TwO is computed with the Expression 4.

$$TwO = \{(TAO - \Delta Tpct) - (TE \times 0.2)\}/0.8 \quad \text{(Expression 4)}$$

The engine-off water temperature Toff is set into smaller one between the reference engine-cooling-water temperature TwO and 70° C., as shown in the Expression 5.

$$Toff = MIN(TwO, 70) \quad \text{(Expression 5)}$$

The engine-on water temperature Ton is set by subtracting a predetermined value such as 5° C. from the engine-off water temperature Toff, thereby restricting the engine 50 from frequently turning on/off.

In addition, the reference engine-cooling-water temperature TwO is an engine-cooling-water temperature needed when it is assumed that the warm air temperature before air mix becomes to agree with the target blow off temperature TAO. TE represents the after-eva temperature. $\Delta Tptc$ is an estimation value for an increase in the blow off temperature due to the electric heater 35, and is calculated on a map according to the operation number of the electric heater 35.

At S112, it is determined whether the engine-on demand is needed based on the engine-cooling-water temperature. At S112, the engine-on demand is determined temporarily. Specifically, the actual engine-cooling-water temperature Tw is compared with the engine-off water temperature Toff and the engine-on water temperature Ton calculated at S111. When the engine-cooling-water temperature is lower than the engine-on water temperature Ton, it is temporarily determined that the engine 50 is turned on as f(Tw)=ON. When the engine-cooling-water temperature is higher than the engine-off water temperature Toff, it is temporarily determined that the engine 50 is turned off as f(Tw)=OFF.

At S113, it is determined whether the seat heater 1012 (FIG. 3) of the seat air-conditioning device 101 is ON, which warms the seat for an occupant. When the seat heater 1012 is OFF at S113, f(SA) is calculated according to the solar amount SA at S114. When the seat heater 1012 is ON at S113, f(SA) is calculated according to the solar amount SA at S115, which is lower than f(SA) of S114.

At S116, f(OT) is selected between ON and OFF according to the value of f(SA) calculated at S114 or S115. OT means the outside air temperature. At the control start time, f(OT) is set as OFF at S116.

At S117, it is determined whether there is a final engine-on demand output from the air-conditioner ECU 60. When the eco-mode is set, if the target blow off temperature TAO is higher than or equal to 20° C., and if f(Tw)=ON, the engine 50 is usually allowed to be ON. However, the engine 50 is not allowed to be ON if f(OT)=OFF and if the preset temperature is less than 28° C., in this case.

Moreover, when the seat heater 1012 is ON at S113, the value of f(SA) is made smaller, because the occupant easily feels too hot. It is made difficult to allow the engine-on demand when the seat heater 1012 is ON, thus fuel consumption can be reduced while the minimum heating is achieved. Furthermore, the noise can be reduced outside of the vehicle, and the power charged in the battery can be effectively used. Moreover, as the solar amount is increased, the engine-on demand is made difficult to be allowed, because the occupant easily feels too hot. Therefore, the minimum heating, the fuel saving, the noise reduction and the effective use of the charged power can be achieved.

Figure 16:
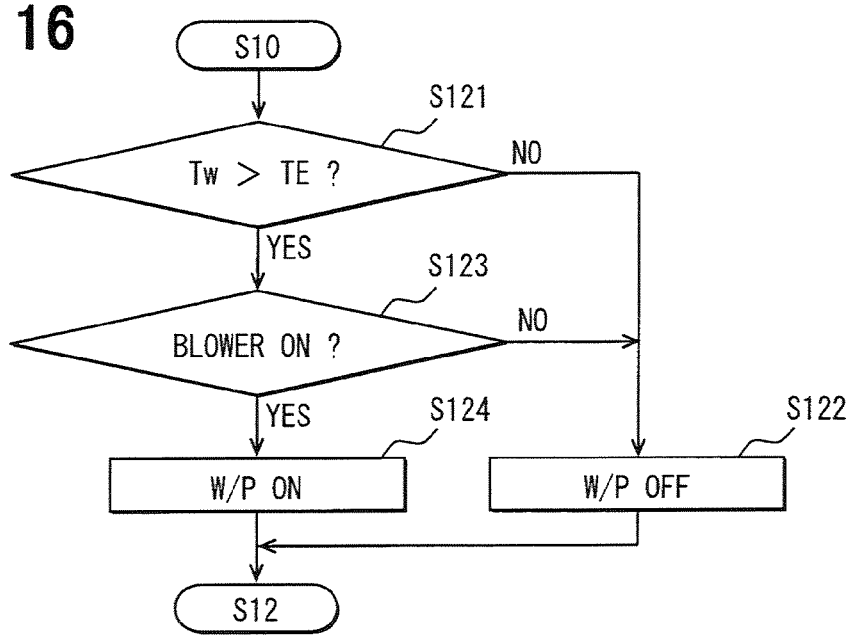
FIG. 16 is a flow chart illustrating a process for determining an operation of a water pump in the air-conditioner of the first embodiment.

Next, the electric water pump operation determination process (S11) is explained based on FIG. 16. As shown in FIG. 16, at S121, it is determined whether the engine-cooling-water temperature Tw (water temperature) detected by the cooling-water-temperature sensor is higher than the after-eva temperature TE. When the water temperature Tw is determined to be lower than or equal to the after-eva temperature TE, the water pump 32 is determined to be OFF at S122, and S11 is ended.

While the engine-cooling-water temperature Tw detected by the cooling-water-temperature sensor is comparatively low and is lower than or equal to the after-eva temperature TE, if the engine cooling water is made to flow through the heater core 34, the blow off temperature will be lowered. Therefore, the electric water pump 32 is turned off at S122.

In contrast, when the water temperature Tw is determined to be higher than the after-eva temperature TE at S121, it is determined whether the blower 16 (FIG. 1) is ON or not at S123. If the blower 16 is not ON, the water pump 32 is turned OFF at S122, and S11 is ended. If the blower 16 is ON at S123, the water pump 32 is turned ON at S124, and S11 is ended.

That is, when the engine-cooling-water temperature Tw is comparatively high and when the blower 16 is OFF (stop), the electric water pump 32 is turned off to save the power. In contrast, when the blower 16 is ON, the electric water pump 32 is turned on. Thereby, the heat of the engine cooling water can be used for air-conditioning also when the engine 50 is off. Therefore, the blow off temperature can be raised to agree with the target blow off temperature TAO. Thus, the temperature in the passenger compartment can be restricted from lowering even when the engine 50 is off.

At S12 of FIG. 4, control signals are output to control the blower 16, the rotation speed of the compressor 41 through the inverter 42, the rotation speed of the outdoor fan 4, the air inlet switching door 13, the air outlet switching doors 21 and 22, the electric water pump 32, and the operation number of the heater wires (PTC) 351-353 of the electric heater 35. Moreover, the display operation in connection with the display 710*a* of the eco-mode switch 710 and the display 708*a* of the auto switch 708 are controlled at S12.

The auto switch 708 is provided in the operation panel 70 of FIG. 5. When the control is performed at the auto mode, the light emitting diode (LED) of the auto mode display 708*a* in the auto switch 708 emits light, so as to indicate that the operation is being performed with the auto mode (namely, an auto indicator corresponding to the auto mode display 708*a* lights up).

The eco-mode switch 710 of FIG. 6 which switches the mode between the eco-mode and the non-eco-mode is arranged in the passenger compartment. When the eco-mode is selected by operating the eco-mode switch 710 by the occupant, the light emitting diode in the eco-mode switch 710 lights up, so as to indicate that the operation is being performed with the eco-mode (namely, an eco-mode indicator corresponding to the eco-mode display 710*a* lights up).

According to the first embodiment, the seat air-conditioning device 101 which heats or cools the seat 1013 in the passenger compartment is operated with the manual mode or the auto mode. At the manual mode, the heating or cooling is controlled according to the value which is manually set. At the auto mode, the heating or cooling is controlled according to the automatically-set value (target blow off temperature TAO).

The air-conditioner ECU 60 automatically sets the auto mode for the seat air-conditioning device 101, when the eco-mode is set for the compressor 41 with the eco-mode switch 710. Therefore, the seat air-conditioning device 101 automatically operates with the auto mode in response to the eco-mode, in which the conditioning degree is lowered to save the power, however, the occupant can be restricted from feeling the shortage in the air-conditioning due to the operation of the seat air-conditioning device 101.

The seat air-conditioning device 101 has the seat heater 1012 and the seat cooler 1011. The seat heater 1011 controls the seat temperature in response to the eco-mode in which the target temperature is set slightly lower, however, the occupant is restricted from feeling cold due to the working of the seat heater 1011. Also when the cooling operation is conducted, the seat cooler 1011 restricts the occupant from feeling too hot.

The seat air-conditioning device 101 which heats or cools the seat 1013 in the passenger compartment is operated with the manual mode or the auto mode. When the eco-mode is set, the seat air-conditioning device 101 is set into the auto mode. Therefore, the air-conditioning can be backed-up by the seat air-conditioning device 101 at the eco-mode, more suitably for the environment of the passenger compartment.

Second Embodiment

A second embodiment will be described with reference to FIG. 17 in addition to FIGS. 1-16. In each subsequent embodiment, the same reference number is given to the same component as the first embodiment, and its explanation is omitted. Points and features different from the first embodiment will be described in details.

When the target temperature in the passenger compartment is lowered by setting the eco-mode by operating the eco-mode switch 710, and when the auto switch 708 of FIG. 5 is turned on, the seat air-conditioning device 101 is automatically operated with the seat auto mode. Thereby, the seat heater 1012 of the seat air-conditioning device 101 is turned on immediately at the moment when the auto mode is set. For this reason, the occupant is restricted from feeling cold.

In FIG. 3, the seat air-conditioning device 101 has the seat heater 1012 which warms the seat 1013 by electric heater. Further, the seat heater switch (seat SW) is provided in the seat air-conditioning panel 1015 which is operated to control the seat heater 1012. The seat air-conditioning device 101 operates with the seat manual mode or the seat auto mode. At the manual mode, the temperature of the seat 1013 is stepwise raised by manually operating the seat heater switch.

Figure 17:
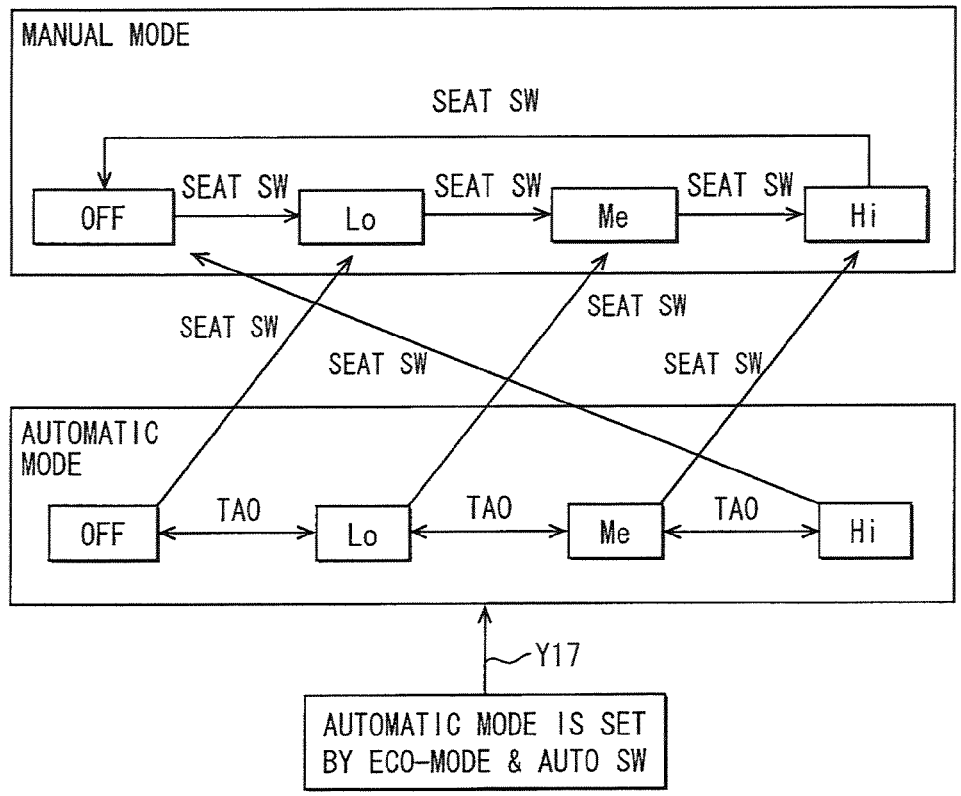
FIG. 17 is an explanatory view illustrating a mode shift in a seat conditioning device according to a second embodiment.

As shown in FIG. 17, the seat manual mode of the seat air-conditioning device 101 has the manual-OFF, the manual- Lo, the manual-Me, and the manual-Hi, which are set in order of the temperature from low to high. The seat air-conditioning device 101 receives a signal of the target blow off temperature TAO from the air-conditioner ECU 60.

When the seat air-conditioning device 101 is set in the seat auto mode by the seat auto switch of the seat air-conditioning panel 1015, the temperature of the seat 1013 is changed according to the target blow off temperature TAO. When the seat heater 1012 operates with the seat auto mode, the mode is changed in order of the auto-OFF, the auto-Lo, the auto-Me, and the auto-Hi, which are set in order of the temperature from low to high.

In FIG. 17 illustrating the second embodiment, when the seat air-conditioning device 101 is set in the seat manual mode, the seat heater 1012 is changed in order of the manual-OFF, the manual-Lo, the manual-Me, and the manual-Hi by every operating the seat heater switch of the seat air-conditioning panel 1015.

For example, at the time of the manual-OFF, while the eco-mode switch 710 of FIG. 6 is operated to change the air-conditioner 100 from the non-eco-mode to the eco-mode, the auto switch 708 of FIG. 5 may be turned ON. At this time, as shown in an arrow direction Y17 of FIG. 17, the operation of the seat air-conditioning device 101 is switched to the seat auto mode. In the seat auto mode, the control state is automatically shifted among the auto-OFF, the auto-Lo, the auto-Me, and the auto-Hi based on the target blow off temperature TAO.

While the seat air-conditioning device 101 is operated with the seat auto mode, if the seat heater switch (seat SW) is operated, the mode is shifted from the auto-OFF to the manual-Lo, from the auto-Lo to the manual-Me, from the auto-Me to the manual-Hi, or from the auto-Hi to the manual-OFF.

The shifting state at the seat auto mode is described. Every time when a signal is received from the air-conditioner ECU 60, the mode is shifted automatically in order of the auto-OFF, the auto-Lo, the auto-Me, and the auto-Hi according to the target blow off temperature TAO, similarly to FIG. 8. The temperature of the seat heater 1012 becomes low in order of Hi, Me and Lo.

Left graph of FIG. 9 illustrates a relationship between the temperature of the seat heater 1012 (heater temperature) and ON or OFF of the seat heater 1012, at the mode of auto-Hi and manual-Hi. The heater temperature represents a target temperature (° C.) of the seat heater 1012 at each mode.

Center graph of FIG. 9 illustrates a relationship between the temperature of the seat heater 1012 (heater temperature) and ON or OFF of the seat heater 1012, at the mode of auto-Me and manual-Me.

Right graph of FIG. 9 illustrates a relationship between the temperature of the seat heater 1012 (heater temperature) and ON or OFF of the seat heater 1012, at the mode of auto-Lo and manual-Lo.

When the air-conditioner 100 is switched from the non-eco-mode to the eco-mode to reduce the power of the compressor 41 by operating the eco-mode switch 710, and when the auto mode is set for the operation of the air-conditioner 100 by turning on the auto switch 708, the target temperature in the passenger compartment is set lower, and the auto mode is set for the operation of the air-conditioner 100.

At the moment receiving a signal representing the change in the control of the air-conditioner 100, as shown in FIG. 17, the seat air-conditioning device 101 is automatically set into the seat auto mode. As a result, the temperature of the seat heater 1012 is promptly and optimally controlled according to the target blow off temperature TAO, as shown in FIG. 8. Therefore, the occupant can be restricted from feeling cold.

The above explanation is conducted as to the operation of the seat heater 1012 of the seat air-conditioning device 101. The seat air-conditioning device 101 is further equipped with the seat cooler 1011 made of, for example, Peltier element, and the same control is possible also for the seat cooler 1011. The air-conditioner 100 may be switched from the non-eco-mode to the eco-mode to reduce the power of the compressor 41 by operating the eco-mode switch 710 when the seat cooler 1011 is operated in summer. At the moment setting the eco-mode to increase the target temperature in the passenger compartment, the seat air-conditioning device 101 is set into the seat auto mode. As a result, the temperature of the seat cooler 1011 is promptly and optimally controlled according to the target blow off temperature TAO to cool the occupant, so the occupant can be restricted from feeling uncomfortable.

According to the second embodiment, the auto mode switch 708 is provided for setting the auto mode in which the temperature of the conditioned-air is automatically controlled by the air-conditioner ECU 60. The seat air-conditioning device 101 is activated when the eco-mode is set and when there is a signal instructing the automatic control input from the auto mode switch 708.

Therefore, the seat air-conditioning device 101 is automatically operated in response to the auto mode of the air-conditioner 100 even if the air-conditioning degree in the passenger compartment is lowered by setting the eco-mode. Thus, the occupant can be restricted from feeling the shortage in the air-conditioning.

Third Embodiment

A third embodiment will be described with reference to FIG. 18 in addition to FIGS. 1-16. In each subsequent embodiment, the same reference number is given to the same component as the first embodiment, and its explanation is omitted. Points and features different from the first embodiment will be described in details.

In the third embodiment, when the eco-mode is set for the air-conditioner 100, and when the ignition switch 74 is turned on, the seat heater 1012 is turned ON at the moment. Alternatively, when the eco-mode is set for the air-conditioner 100, and when a signal starting the air-conditioning is output from the blower switch 705 by turning on the blower switch 705, the seat heater 1012 is turned ON at the moment. Thus, the occupant is restricted from feeling cold.

In FIG. 3, the seat air-conditioning device 101 has the seat heater 1012 which warms the seat 1013 by electric heater, and the seat heater switch (seat SW of FIG. 18) in the seat air-conditioning panel 1015 which controls the seat heater 1012. The seat air-conditioning device 101 operates with the seat manual mode or the seat auto mode. At the manual mode, the temperature of the seat 1013 is stepwise raised by manually operating the seat heater switch.

The seat manual mode of the seat air-conditioning device 101 has the manual-OFF, the manual-Lo, the manual-Me, and the manual-Hi, which are set in order of the temperature from low to high. The seat air-conditioning device 101 receives a signal of the target blow off temperature TAO from the air-conditioner ECU 60.

When the seat air-conditioning device 101 is set in the seat auto mode by the seat auto switch of the seat air-conditioning panel 1015, the temperature of the seat 1013 is changed according to the target blow off temperature TAO. When the seat heater 1012 operates with the seat auto mode, the mode is changed in order of the auto-OFF, the auto-Lo, the auto-Me, and the auto-Hi, which are set in order of the temperature from low to high.

Figure 18:
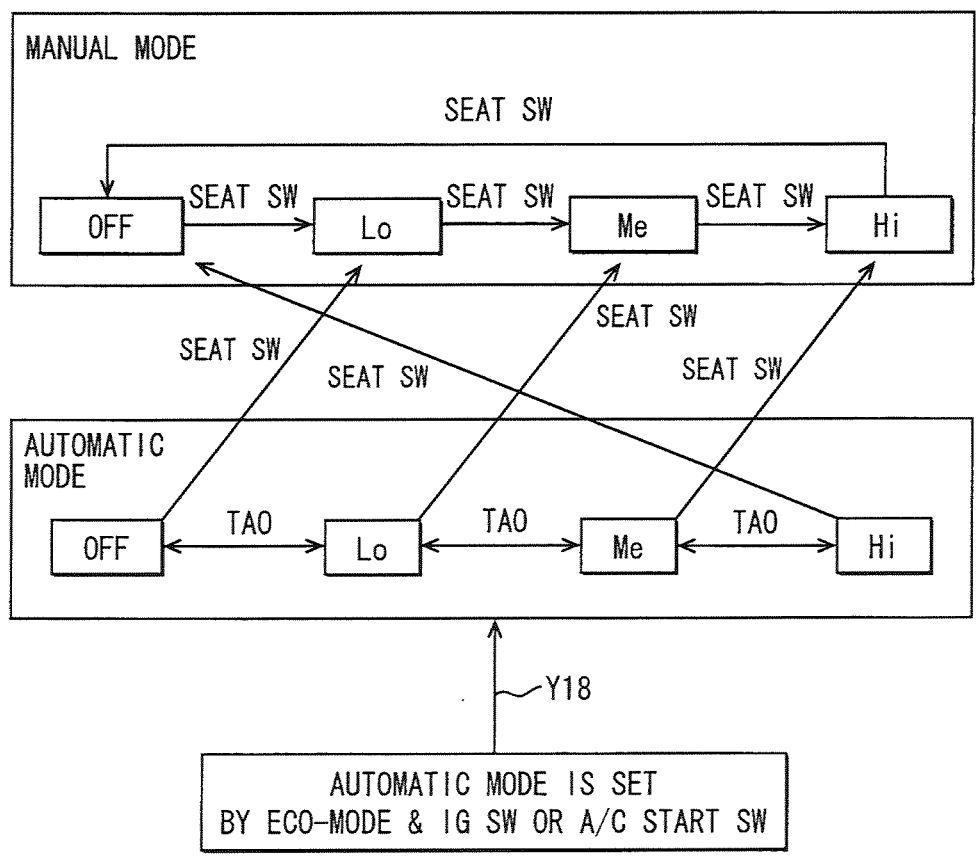
FIG. 18 is an explanatory view illustrating a mode shift in a seat conditioning device according to a third embodiment.

In FIG. 18 illustrating the third embodiment, when the seat air-conditioning device 101 is set in the seat manual mode, the seat heater 1012 is changed in order of the manual-OFF, the manual-Lo, the manual-Me, and the manual-Hi by every operating the seat heater switch.

For example, at the time of the manual-OFF, if the eco-mode switch 710 of FIG. 6 is operated to change the air-conditioner 100 from the non-eco-mode to the eco-mode, and if the ignition switch 74 or the blower switch 705 is turned on, at the moment, as shown in an arrow direction Y18 of FIG. 18, the operation of the seat air-conditioning device 101 is switched to the seat auto mode. In the seat auto mode, the control state is automatically shifted among the auto-OFF, the auto-Lo, the auto-Me, and the auto-Hi based on the target blow off temperature TAO.

While the seat air-conditioning device 101 is operated with the seat auto mode, if the seat heater switch (seat SW) is operated, the mode is shifted from the auto-OFF to the manual-Lo, from the auto-Lo to the manual-Me, from the auto-Me to the manual-Hi, or from the auto-Hi to the manual-OFF.

The shifting state at the seat auto mode is shown in FIG. 18. Every time when a signal is received from the air-conditioner ECU 60, the mode is shifted automatically in order of the auto-OFF, the auto-Lo, the auto-Me, and the auto-Hi according to the target blow off temperature TAO. The temperature of the seat heater 1012 becomes low in order of Hi, Me and Lo.

Left graph of FIG. 9 illustrates a relationship between the temperature of the seat heater 1012 and ON or OFF of the seat heater 1012, at the mode of auto-Hi and manual-Hi. The heater temperature represents a target temperature (° C.) of the seat heater 1012 at each mode.

Center graph of FIG. 9 illustrates a relationship between the temperature of the seat heater 1012 and ON or OFF of the seat heater 1012, at the mode of auto-Me and manual-Me.

Right graph of FIG. 9 illustrates a relationship between the temperature of the seat heater 1012 and ON or OFF of the seat heater 1012, at the mode of auto-Lo and manual-Lo.

When the vehicle is started by turning on the ignition switch 74, or when the signal starting the air-conditioning is generated by turning on the blower switch 705, the eco-mode may be set by operating the eco-mode switch 710 from the non-eco-mode. When the target temperature in the passenger compartment is made lower due to the eco-mode, as shown in FIG. 18, the seat air-conditioning device 101 is automatically set into the seat auto mode. As a result, the temperature of the seat heater 1012 is promptly and optimally controlled according to the target blow off temperature TAO, as shown in FIG. 8. Therefore, the occupant can be restricted from feeling cold.

The above explanation is conducted as to the operation of the seat heater 1012 of the seat air-conditioning device 101. The seat air-conditioning device 101 is further equipped with the seat cooler 1011 made of, for example, Peltier element, and the same control is possible also for the seat cooler 1011.

According to the third embodiment, the ignition switch 74 which generates the start signal of the vehicle, or the blower switch 705 which generates the start signal of the air-conditioning is provided. The seat air-conditioning device 101 may be automatically activated in response to the start signal of the vehicle or the start signal of the air-conditioning when the eco-mode is set.

Therefore, the seat air-conditioning device 101 is automatically operated in response to the turning on of the ignition switch 74 or the blower switch 705 even if the air-conditioning degree in the passenger compartment is lowered due to the eco-mode. Because the seat air-conditioning device 101 is automatically operated, the occupant can be restricted from feeling the shortage in the air-conditioning.

The ignition switch 74 may correspond to an activation signal generator generating a first signal activating the vehicle. The blower switch 705 may correspond to an air-conditioning start signal generator generating a second signal starting the air-conditioning. The seat temperature control system is automatically activated in response to the first signal or the second signal when the eco-mode is set.

Fourth Embodiment

A fourth embodiment will be described with reference to FIG. 19 in addition to FIGS. 1-16. In each subsequent embodiment, the same reference number is given to the same component as the first embodiment, and its explanation is omitted. Points and features different from the first embodiment will be described in details.

In the fourth embodiment, if the eco-mode is set when the ignition switch is turned on, the seat air-conditioning is operated at the seat auto mode. In contrast, if the non-eco-mode is set when the ignition switch is turned on, the seat air-conditioning is not operated with the manual-OFF mode.

Figure 19:
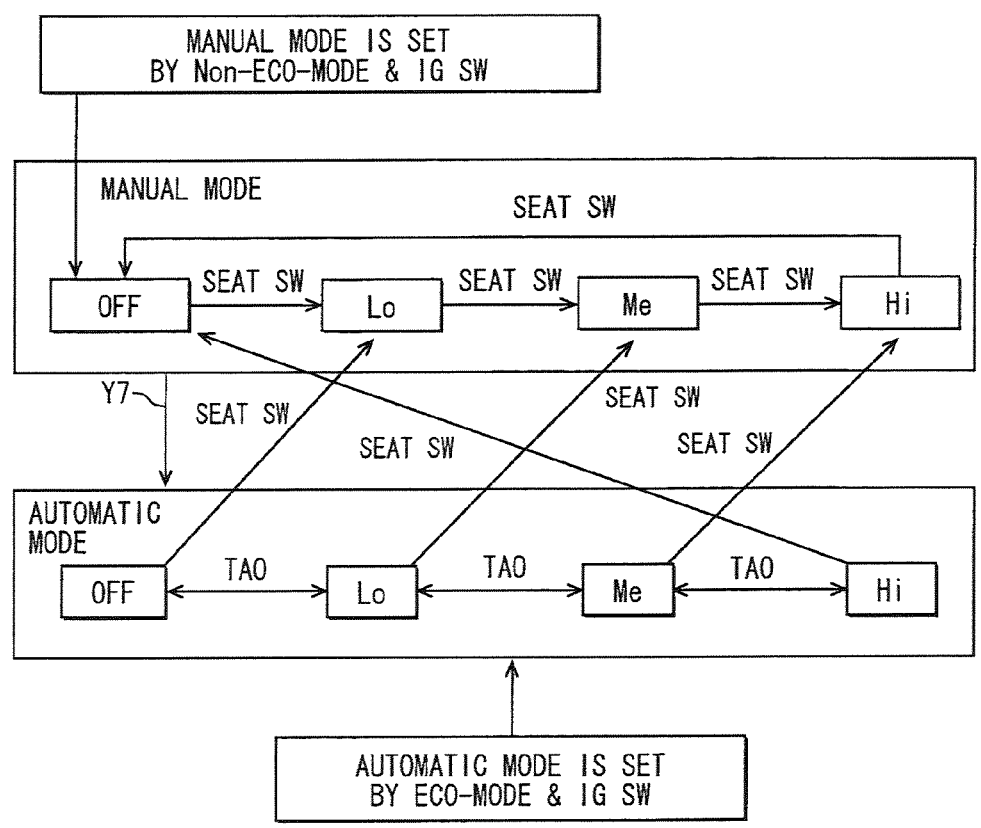
FIG. 19 is an explanatory view illustrating a mode shift in a seat conditioning device according to a fourth embodiment.

Specifically, in FIG. 19 illustrating the fourth embodiment, the seat heater is usually shifted stepwise in order of the manual-OFF, the manual-Lo, the manual-Me, and the manual-Hi, whenever the seat heater switch is operated. When the ignition switch 74 is turned ON from OFF at the eco-mode, the seat heater is shifted to the seat auto mode in which the mode is automatically changed among the auto-OFF, the auto-Lo, the auto-Me and the auto-Hi based on the target blow off temperature TAO. On the other hand, when the ignition switch is turned ON from OFF at the non-eco-mode, the seat heater is shifted to the manual-OFF mode.

Therefore, even when the target temperature in the passenger compartment is set lower due to the eco-mode, the occupant can be restricted from feeling cold because the seat heater is activated. Also at a cooling operation, the occupant can be restricted from feeling hot, because the seat cooler is activated.

Moreover, if the non-eco-mode is set when the ignition switch 74 is turned on, the seat air-conditioning is switched into the manual-OFF mode. Therefore, the setting of the seat air-conditioning continues to be the same as the previous mode (for example, the manual-Hi mode is continued) even when the ignition switch 74 is turned on, so the power consumption of the seat air-conditioning can be restricted from increasing.

Fifth Embodiment

A fifth embodiment will be described with reference to FIG. 20 in addition to FIGS. 1-16. In each subsequent embodiment, the same reference number is given to the same component as the first embodiment, and its explanation is omitted. Points and features different from the first embodiment will be described in details.

Figure 20:
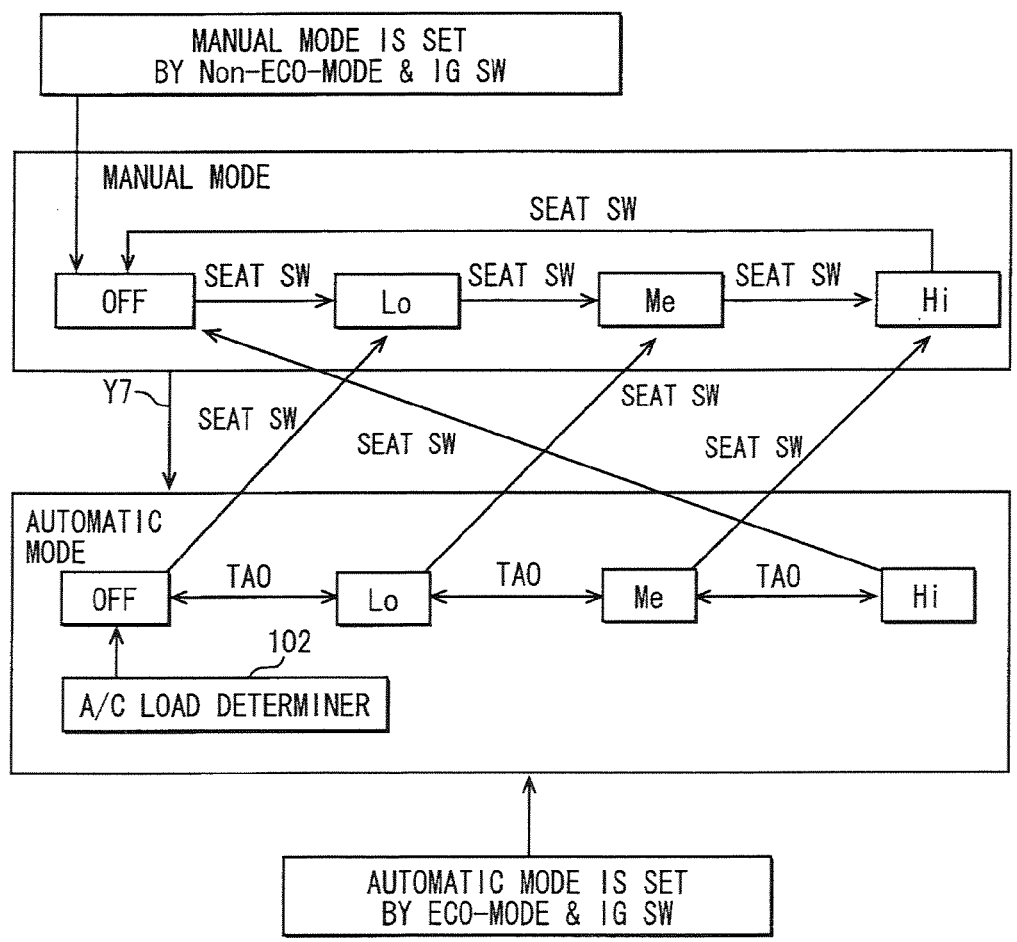
FIG. 20 is an explanatory view illustrating a mode shift in a seat conditioning device according to a fifth embodiment.

In FIG. 20 illustrating the fifth embodiment, the seat heater is usually shifted stepwise in order of the manual-OFF, the manual-Lo, the manual-Me, and the manual-Hi, whenever the seat heater switch is operated. When the ignition switch 74 is turned ON from OFF at the eco-mode, the seat heater is shifted to the seat auto mode in which the mode is automatically changed among the auto-OFF, the auto-Lo, the auto-Me and the auto-Hi based on the target blow off temperature TAO. On the other hand, when the ignition switch is turned ON from OFF at the non-eco-mode, the seat heater is shifted to the manual-OFF mode.

Moreover, an air-conditioning (A/C) load determiner 102 of FIG. 20 determines whether the air-conditioning load of the air-conditioner is large or small based on the outside air temperature which is a temperature of air outside of the vehicle. When it is determined that the outside air temperature is low (when the air-conditioning load is small), the mode is shifted to the auto-OFF of the seat auto mode in FIG. 20.

Therefore, even when the target temperature in the passenger compartment is set lower at the eco-mode, the occupant can be restricted from feeling cold because the seat heater is activated. Also at a cooling operation, the occupant can be restricted from feeling hot because the seat cooler is activated.

Moreover, if the non-eco-mode is set when the ignition switch 74 is turned on, the seat air-conditioning is switched into the manual-OFF mode. That is, when the ignition switch 74 is turned on, the setting of the seat air-conditioning continues to be the same as the previous mode (for example, the manual-Hi mode is continued), so the power consumption of the seat air-conditioning can be restricted from increasing.

That is, because the last-time manual setting status of the seat air-conditioning device is reset, the seat air-conditioning device is restricted from having useless operation, thus more power saving can be achieved. Furthermore, when it is determined that the air-conditioning load is small, the seat air-conditioning device is shifted into the auto-OFF mode of the seat auto mode. Thus, the seat air-conditioning device is restricted from having useless operation when the air-conditioning load is small.

Sixth Embodiment

Figure 21:
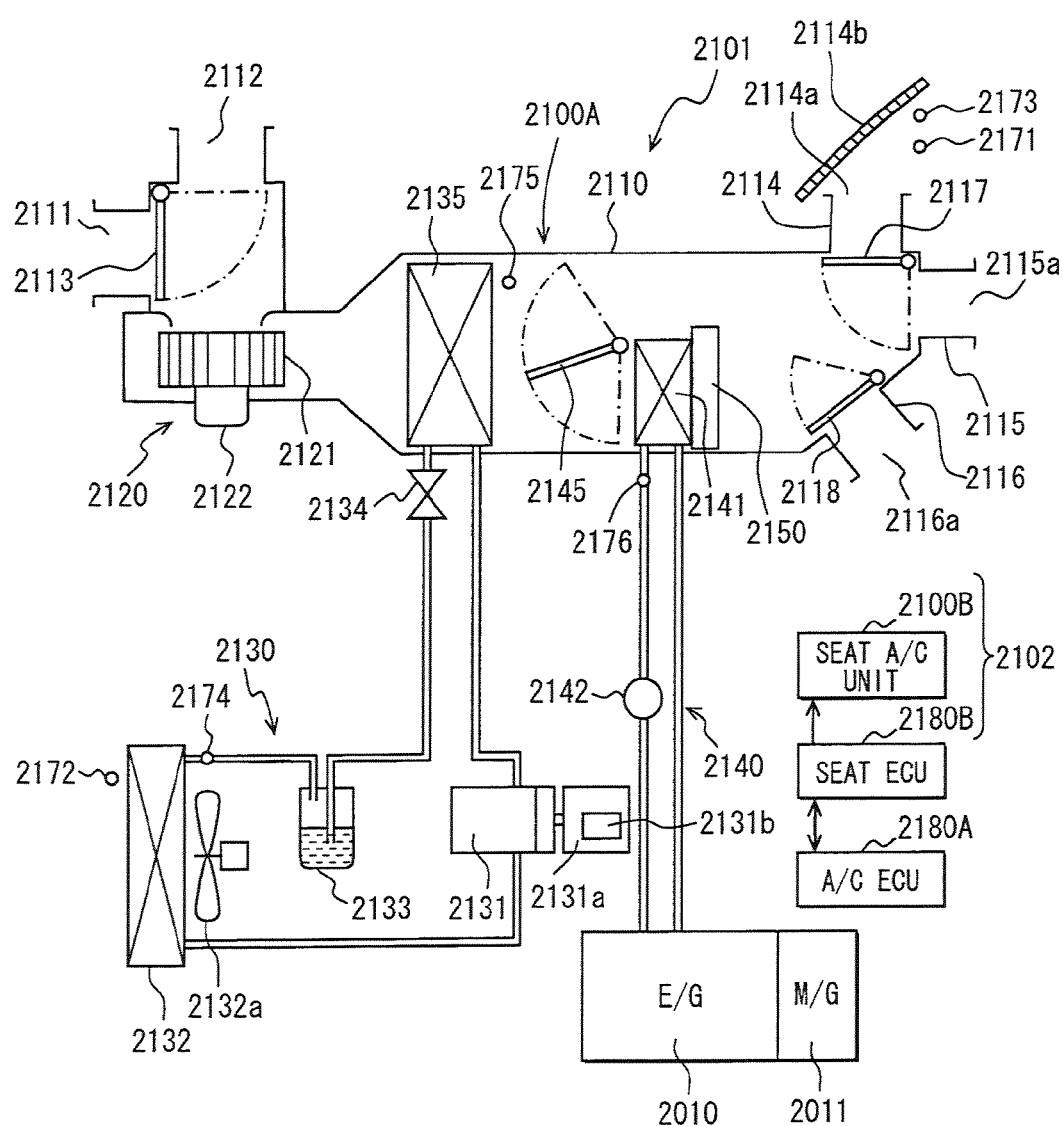
FIG. 21 is a schematic diagram illustrating an air-conditioner according to a sixth embodiment.

A sixth embodiment will be described with reference to FIGS. 21-33. As shown in FIGS. 21 and 23, a seat conditioner 2102 is used for a hybrid car which has an engine 2010, a motor 2011 (motor generator) and an engine electronic control unit (ECU) 2012. The engine ECU 2012 controls startup and stop of the engine 2010. The seat conditioner 2102 controls the temperature of the seat of the hybrid car to agree with a preset temperature. The hybrid car has an air-conditioner 2101 which air-conditions the inside of the passenger compartment.

The air-conditioner 2101 has an air conditioning unit 2100A and an air-conditioner ECU 2180A.

Figure 22:
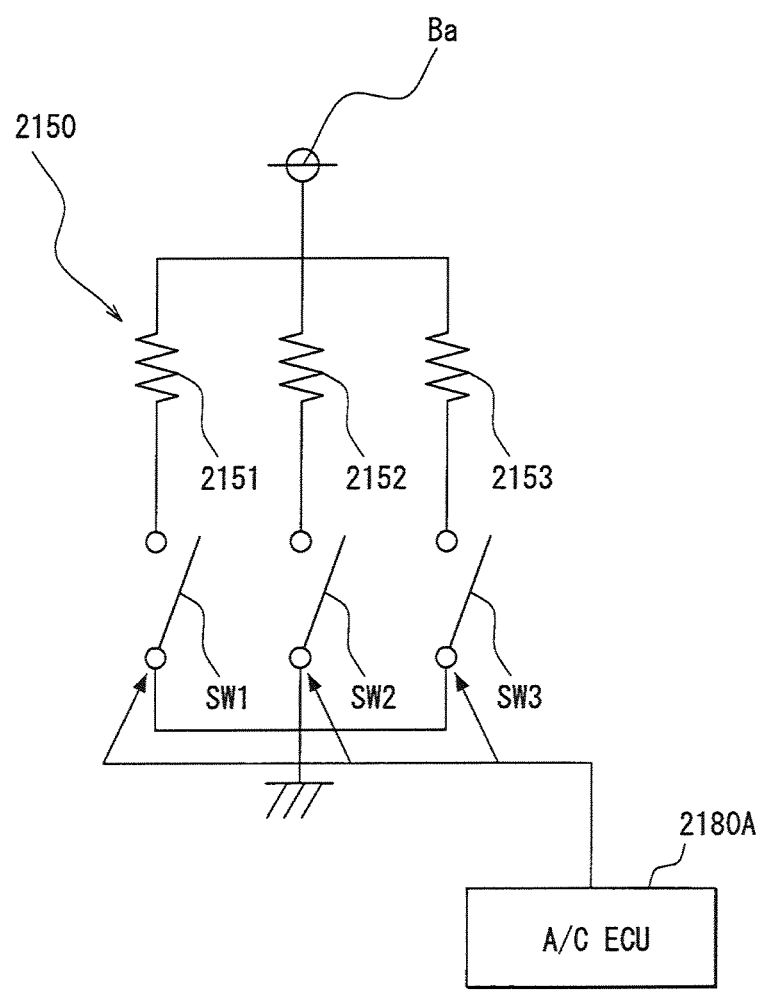
FIG. 22 is a schematic diagram illustrating an electric heater of the air-conditioner of the sixth embodiment.
Figure 23:
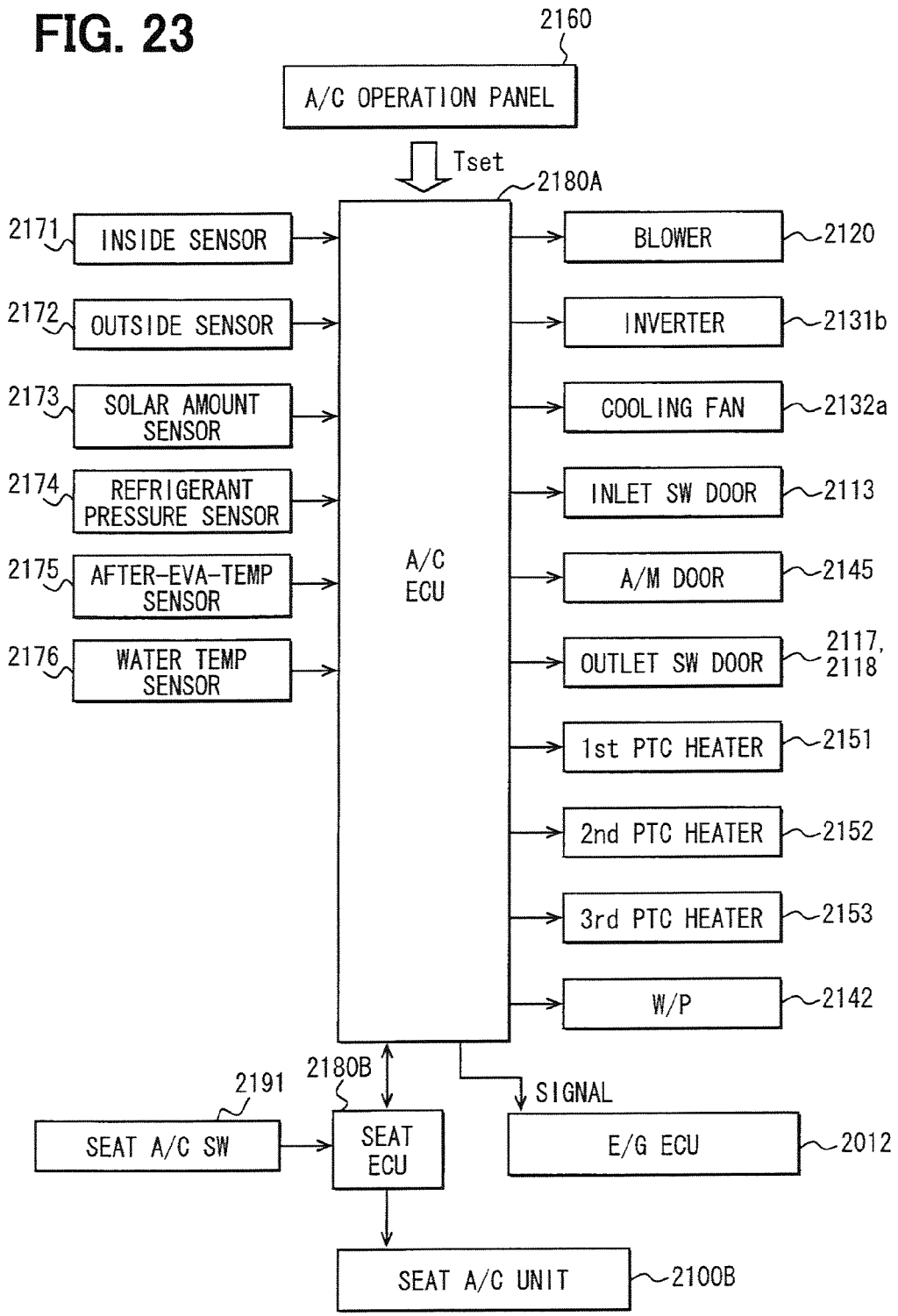
FIG. 23 is a schematic diagram illustrating an electric construction of the air-conditioner of the sixth embodiment.

As shown in FIGS. 21-23, the air conditioning unit 2100A has an air conditioning duct 2110, a blower 2120, a refrigerating cycle 2130, a cooling water circuit 2140, an air mix door 2145, an electric heater 2150, an air-conditioner console (operation) panel 2160 and various sensors 2171, 2172, 2173, 2174, 2175, 2176.

The duct 2110 is arranged at a front side of the passenger compartment of the hybrid car. The most upstream side of the air conditioning duct 2110 serves as an inlet box switching to draw inside air or outside air, and the inlet box has an inside air inlet 2111 from which air (inside air) in the passenger compartment is drawn and an outside air inlet 2112 from which air (outside air) is drawn from outside the passenger compartment.

An air switching door 2113 is rotatably disposed at inner sides of the inlets 2111, 2112. The door 2113 is driven by an actuator such as servo motor, and changes the air inlet mode among an inside air circulation (REC) mode, a combine (REC/FRS) mode, and an outside air introduction (FRS) mode. The actuator of the door 2113 is controlled by the air-conditioner ECU 2180A.

The most downstream side of the air conditioning duct 2110 serves as a outlet box switching the outlet to output conditioned-air, and the outlet box has a defroster (DEF) opening, a face (FACE) opening, and a foot (FOOT) opening.

A defroster duct 2114 is connected to the DEF opening, and the most downstream end of the defroster duct 2114 has a defroster outlet 2114a which blows off conditioned-air toward an inner surface of a front windshield 2114b of the hybrid car. A face duct 2115 is connected to the FACE opening, and the most downstream end of the face duct 2115 has a face outlet 2115a which blows off conditioned-air toward an upper body of an occupant. A foot duct 2116 is connected to the FOOT opening, and the most downstream end of the foot duct 2116 has a foot outlet 2116a which blows off conditioned-air toward a foot of an occupant.

A first outlet switching door 2117 is rotatably mounted on the inner side of the outlets 2114a, 2115a, and a second outlet switching door 2118 is rotatably mounted on the inner side of the outlet 2116a. The outlet switching door 2117, 2118 is driven by an actuator such as servo motor, so as to change the air outlet mode among a face mode (FACE), a bilevel mode (B/L), a foot mode (FOOT), a foot defroster mode (F/D), and a defroster mode (DEF). The actuator of the outlet switching door 2117, 2118 is controlled by the air-conditioner ECU 2180A.

The blower 2120 is located at downstream of the inlet box, and has a centrifugal type fan 2121 and a blower motor 2122 driving to rotate the fan 2121. The fan 2121 is rotatably accommodated in a scroll case integrated with the air conditioning duct 2110. The blower motor 2122 is controlled by the air-conditioner ECU 2180A. A blower air amount (rotating speed of the fan 2121) is controlled based on a blower voltage impressed to a terminal of the motor 2122 through a blower drive circuit.

The refrigerating cycle 2130 has a refrigerant piping connecting a compressor 2131, a condenser 2132, a receiver 2133, an expansion valve 2134, and an evaporator 2135 in this order. The compressor 2131 compresses refrigerant, and the condenser 2132 condenses the compressed refrigerant. The receiver (gas liquid separator, liquid receiver) 2133 separates the condensed refrigerant into gas or liquid, and only liquid refrigerant can flow downward from the receiver 2133. The expansion valve 2134 decompresses and expands the liquid refrigerant. The evaporator 2135 evaporates the decompressed and expanded refrigerant.

The compressor 2131 is an electrically-driven compressor driven by a motor 2131a. A rotation speed of the motor 2131a is controlled by an inverter 2131b. The condenser 2132 is an outdoor heat exchanger which causes refrigerant flowing inside to exchange heat with outside air, for example, sent by a cooling fan 2132a, and is placed to easily receive the running wind produced when the hybrid car travels. The evaporator 2135 is an indoor heat exchanger which cools and dehumidifies air (to be conditioned) passing inside, and is placed downstream of the blower 2120 to close the all passage of the air conditioning duct 2110. The inverter 2131b and the cooling fan 2132a are controlled by the air-conditioner ECU 2180A.

The cooling water circuit 2140 has a water pump 2142 which circulates the cooling water warmed by the water jacket of the engine 2010, and has a radiator (not shown), a thermostat (not shown), and a heater core 2141.

The cooling water (warmed water) of the engine 2010 flows inside of the heater core 2141 which is a heat exchanger for heating air to be conditioned using the warmed cooling water as a heat source for heating. The heater core 2141 is placed downstream of the evaporator 2135 to close a part of the passage of the air conditioning duct 2110. The heater core 2141 reheats the air cooled by the evaporator 2135. The maximum heating capacity of the heater core 2141 is proportional to the temperature of the cooling water, and becomes higher as the temperature of the cooling water becomes higher. The water pump 2142 is an electric pump driven by a motor which is controlled by the air-conditioner ECU 2180A.

The air mix door 2145 is rotatably arranged on the upstream side of the heater core 2141, and is driven by an actuator such as servo motor. A ratio between the air amount which passes the heater core 2141 and the air amount which bypasses the heater core 2141 is adjusted by a stop position (opening SW) of the door 2145. Thus, the blow off temperature of air blown off into the passenger compartment is adjusted. The opening SW of the door 2145 is controlled by the air-conditioner ECU 2180A between 0% and 100%. The door 2145 completely closes the front face of the heater core 2141 when the opening SW of the door 2145 is 0%. The door 2145 completely closes the bypass passage opposite from the heater core 2141 when the opening SW of the door 2145 is 100%.

The electric heater 2150 is a supplementary heating equipment which heats the warmed air which passed the heater core 2141, and is arranged at the downstream of the heater core 141. The electric heater 2150 may be made of a PTC heater, for example. As shown in FIG. 22, the electric heater 2150 has heater wires 2151, 2152, 2153 made of nichrome wire, for example, and the heater wires 2151, 2152, 2153 are connected in parallel with each other between a power source Ba and the ground. Switch elements SW1, SW2, SW3 are provided to the heater wires 2151, 2152, 2153, respectively, and control the electricity supply to the heater wires 2151, 2152, 2153 from the power source Ba by being turned on or off by the air-conditioner ECU 2180A.

The air-conditioner console panel 2160 is a panel having the following switches for operating the air conditioning unit 2100A based on requirements of an occupant. An air-conditioner (A/C) switch is used for starting or stopping the compressor 2131 of the refrigerating cycle 2130. An inlet mode switch is used for switching the air inlet mode. A temperature setting switch is used for setting the temperature in the passenger compartment. An air amount switch is used for changing the air amount (Off, Auto, Lo, Me, Hi) of the blower 2120. An outlet mode switch is used for switching the air outlet mode. An eco-mode switch is used for choosing an eco-operation (eco-mode) of the air conditioning unit 2100A. A switch signal inputted from each switch of the air-conditioner console panel 2160 is outputted to the air-conditioner ECU 2180A.

An inside air temperature sensor 2171 outputs an inside air temperature signal equivalent to the air temperature (inside air temperature) in the passenger compartment. An outside air temperature sensor 2172 generates an outside air temperature signal equivalent to the air temperature (outside air temperature) outside of the passenger compartment. A solar sensor 2173 generates a solar amount signal equivalent to the solar amount irradiated to the passenger compartment. A refrigerant pressure sensor 2174 generates a pressure signal equivalent to the high pressure side pressure of the refrigerating cycle 2130. An after-evaporator temperature sensor 2175 generates an after-evaporator temperature signal equivalent to the air temperature downstream of the evaporator 2135. A water temperature sensor 2176 generates a cooling-water-temperature signal equivalent to the temperature of the cooling water which flows into the heater core 2141. A sensor signal generated by the sensor 2171-2176 is outputted to the air-conditioner ECU 2180A.

The air-conditioner ECU 2180A is mainly constructed of a microcomputer having a CPU, a ROM and a RAM (which are not shown). As shown in FIG. 23, the switch signal outputted from the air-conditioner console panel 2160, and the sensor signal outputted from the sensors 2171-2176 are A/D converted by an input circuit (not shown) of the air-conditioner ECU 2180A, and are inputted into the microcomputer. The air-conditioner ECU 2180A controls the operation of the air conditioning unit 2100A based on the A/D converted signals, and outputs an engine-on-demand signal to the engine ECU 2012 of the engine 2010. The air-conditioner ECU 2180A is energized by a direct current power supplied from a battery when the ignition switch of the hybrid car is turned on.

Next, the seat conditioner 2102 will be explained. As shown in FIG. 1, the seat conditioner 2102 has a seat conditioning unit 2100B and a seat ECU 2180B.

The seat conditioning unit 2100B is an air-conditioner which blows off warmed air or cooled air toward an occupant from plural pores formed on the bottom surface and the backrest surface of the seat. The seat conditioning unit 2100B has a seat blower (not shown), a Peltier element (not shown), and a seat conditioning switch 2191. The Peltier element heats or cools air sent from the seat blower. The seat conditioning switch 2191 is operated by an occupant to switch the operation of the seat conditioning unit 2100B between heating and cooling, to change the heating level (Lo, Me, Hi), and to change the cooling level (Lo, Me, Hi). The seat conditioning switch 2191 is located in or adjacent to the air-conditioner console panel 2160.

The seat ECU 2180B may correspond to a controller, and has a microcomputer (not shown) with CPU, ROM, RAM, etc., similarly to the air-conditioner ECU 2180A. As shown in FIG. 23, a seat switch signal outputted from the seat conditioning switch 2191 is A/D converted by an input circuit (not shown) in the seat ECU 2180B, and is inputted into the microcomputer. The seat ECU 2180B controls the operation of the seat conditioning unit 2100B based on the A/D converted seat switch signal.

Specifically, the seat ECU 2180B changes the polarity of the voltage impressed to the Peltier element of the seat conditioning unit 2100B based on the seat switch signal so as to switch the operation between heating and cooling. Furthermore, the seat ECU 2180B adjusts the voltage level impressed to the Peltier element so as to adjust the heating amount or the heat-absorbing amount. The seat ECU 2180B is supplied with direct current power from a battery when the ignition switch of the hybrid car is turned on.

The air-conditioner ECU 2180A and the seat ECU 2180B are mutually connected by a communication portion, therefore various signals and computed results can be transmitted between the ECU 2180A and the ECU 2180B.

Figure 24:
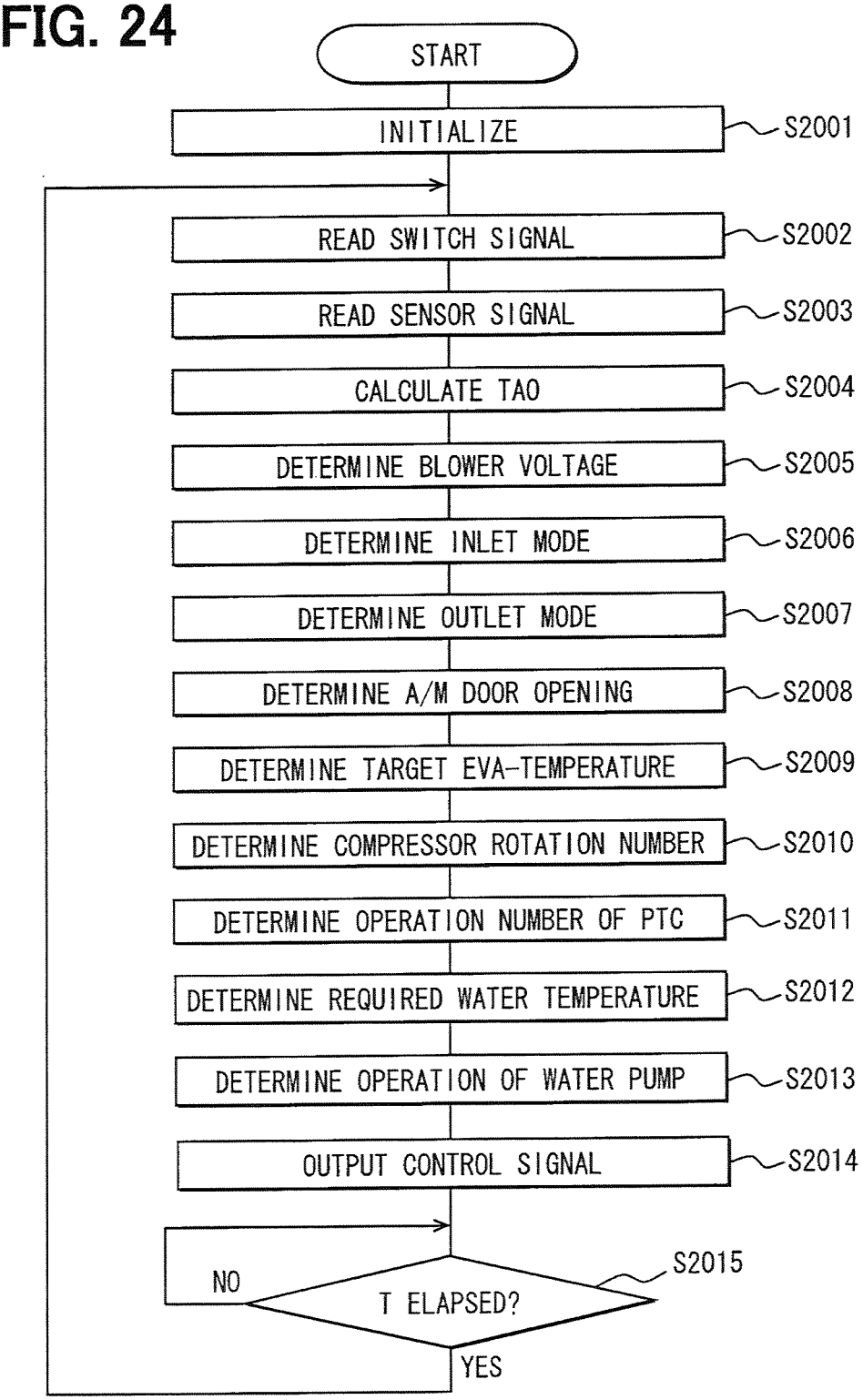
FIG. 24 is a flow chart illustrating a fundamental control process performed by an air-conditioning ECU of the air-conditioner of the sixth embodiment.
Figure 25:
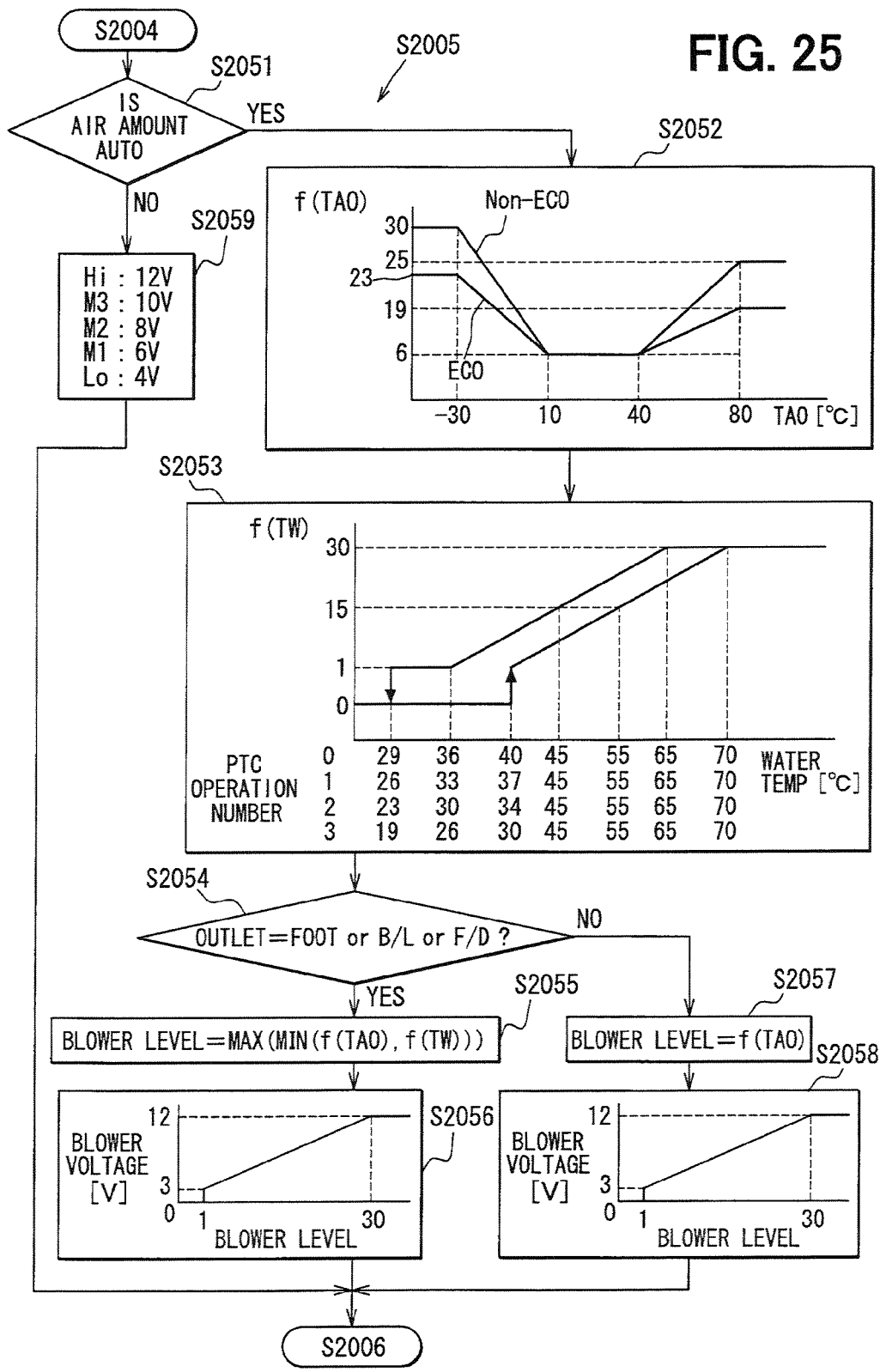
FIG. 25 is a flow chart illustrating a process for determining a blower voltage in the air-conditioner of the sixth embodiment.

A control process conducted by the ECU 2180A will be described with reference to FIGS. 24-33. FIG. 24 is a flow chart which shows the fundamental control process executed by the air-conditioner ECU 2180A, and FIGS. 25-33 show subroutines illustrating details in each process of FIG. 24.

When the ignition switch is turned on to supply direct current power to the air-conditioner ECU 2180A, the routine of FIG. 24 (FIGS. 25-33) is started, and the air-conditioner ECU 2180A performs initialization and initial setting at S2001.

At S2002, a switch signal input from each switch of the consol panel 2160 is read. Then, sensor signals obtained from the sensors 2171-2176 are read as the A/D converted signals at S2003.

When the ignition switch is turned on, direct current power is supplied also to the seat ECU 2180B, and the control of the seat conditioning unit 2100B is started based on the seat switch signal from the seat conditioning switch 2191.

At S2004, a target blow off temperature TAO is calculated by using the following Expression 1 memorized in the ROM. The target temperature TAO is used as a target temperature of air blown into the passenger compartment.

$$TAO=Kset \times Tset-Kr \times Tr-Kam \times Tam-Ks \times Ts+C \quad \text{(Expression 1)}$$

Here, Tset represents the preset temperature set with the temperature setting switch. Tr represents the inside air temperature detected by the inside air temperature sensor 2171. Tam represents the outside air temperature detected by the outside air temperature sensor 2172. Ts represents the solar amount detected by the solar sensor 2173. Values of Kset, Kr, Kam and Ks are gains, and a value of C is a correcting constant for the whole of Expression 1.

Then, at S2005, the voltage (air amount) of the blower 2120 is determined. The blower voltage determination is carried out based on the subroutine (S2051-S2058) of FIG. 25.

At S2051, it is determined whether the setting of the air amount is auto (automatic). When the setting of the air amount is auto, a temporary blower level f(TAO), which will serve as a base, is calculated from a map memorized in the ROM at S2052. Here, the blower level f(TAO) is set higher on a lower side and a higher side in the target blow off temperature TAO, and is set lower in a middle range of the target blow off temperature TAO. The blower level f(TAO) at the eco-mode is set lower than the blower level f(TAO) at the non-eco-mode. Thereby, power consumption of the blower is reduced, and the rise in the temperature of the evaporator 2135 becomes late at a cooling operation time. In contrast, at a heating operation time, the decrease in the temperature of the cooling water of the engine becomes late, so energy required by the air-conditioner 2101 can be reduced.

Figure 30:
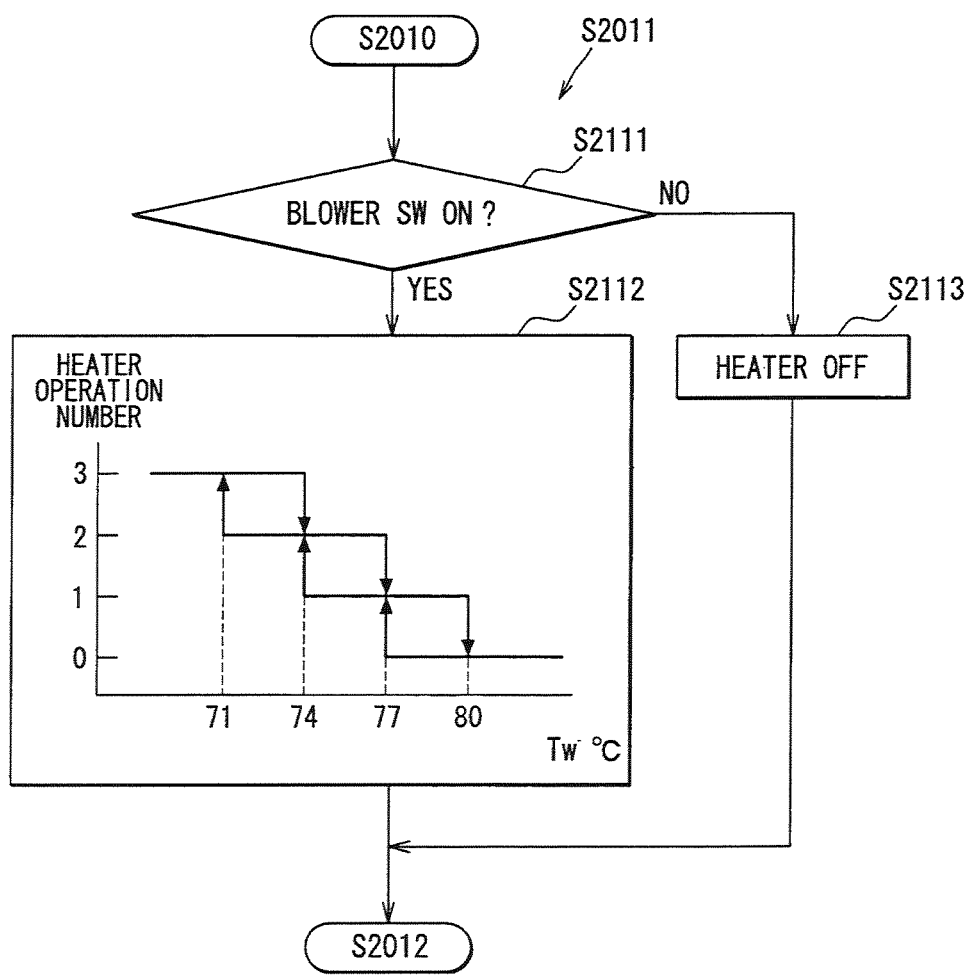
FIG. 30 is a flow chart illustrating a process for determining a PTC operation number in the air-conditioner of the sixth embodiment.

At S2053, a warm-up air amount f(TW) is computed according to the water temperature TW of the heater core 2141, and the PTC operation number of the electric heater 2150 (see S2011 of FIG. 30).

At S2054, the air outlet mode is determined as the foot mode (FOOT), the bilevel mode (B/L), the foot defroster mode (F/D) or the other.

When the air outlet mode is determined as one of the foot mode, the bilevel mode, and the foot defroster mode at S2054, it is determined which is larger between the minimum value of the blower level f(TAO) and the warm-up air amount f(TW), and the larger one is selected as the blower level at S2055. The blower level selected at S2055 is converted into a blower voltage using a map at S2056.

When the air outlet mode is determined as the other at S2054, for example when the air outlet mode is set only at the face mode (FACE), the blower level f(TAO) is selected as a blower level at S2057.

At S2058, the selected blower level f(TAO) is converted into a blower voltage using a map memorized in the ROM.

When the setting of the air amount is manual at S2051, voltage (from 4V to 12V) is applied to the blower based on a map at S2059.

Figure 26:
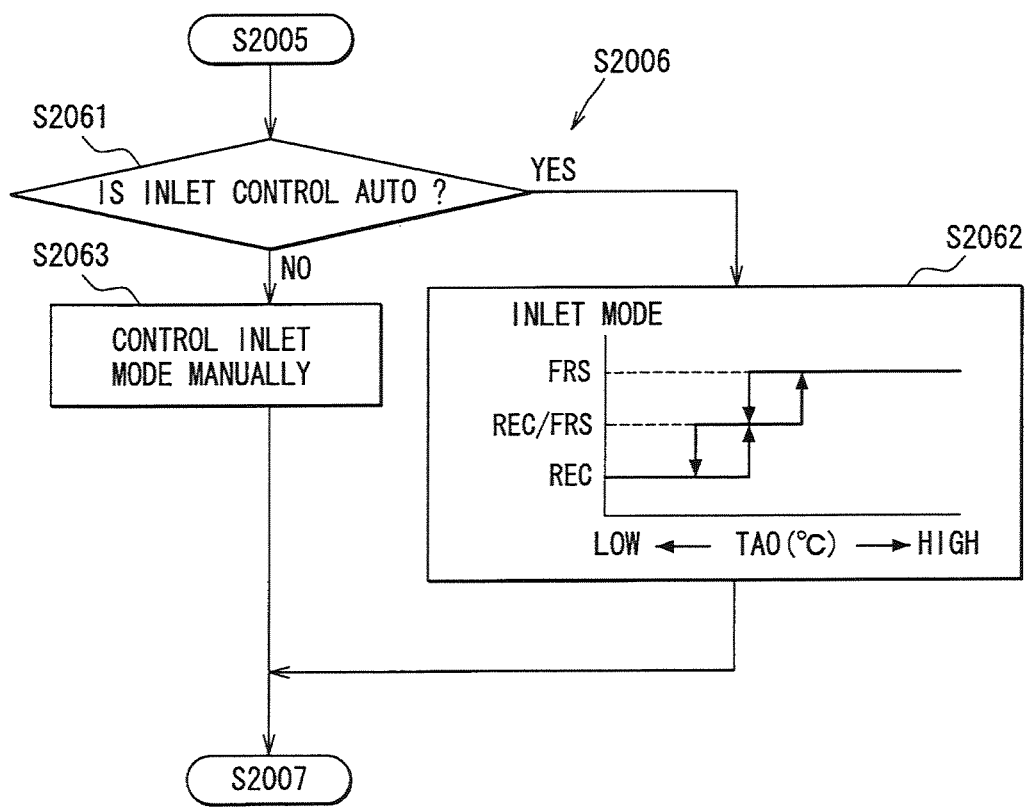
FIG. 26 is a flow chart illustrating a process for determining an air inlet mode in the air-conditioner of the sixth embodiment.

Next, at S2006, the air inlet mode is determined based on the target blow off temperature TAO in an inlet mode determination with reference to S2061-S2063 of FIG. 26.

At S2061, it is determined whether the air inlet control is auto or not. When the air inlet control is auto, the air inlet switch control is performed according to the target blow off temperature TAO at S2062. As the target blow off temperature TAO is changed from low to high, the air inlet mode is switched in order of the REC mode, the REC/FRS mode and the FRS mode.

When the air inlet control is manual, the air inlet control is performed according to the manual setting at S2063. That is, the outside air introduction rate is set as 0% at the time of inside air mode (REC), or is set as 100% at the time of outside air mode (FRS).

Figure 27:
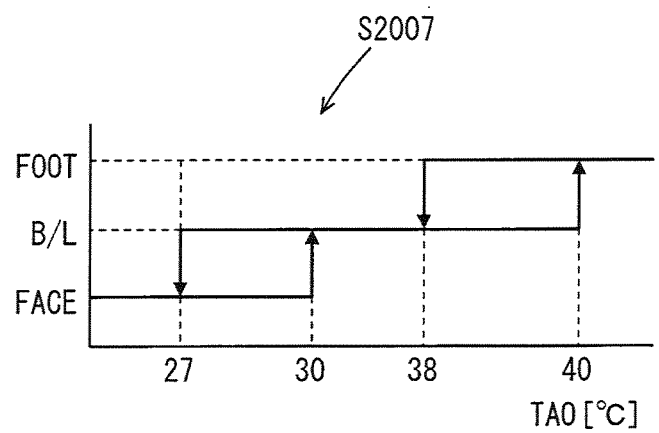
FIG. 27 is a flow chart illustrating a process for determining an air outlet mode in the air-conditioner of the sixth embodiment.

Next, at S2007, the air outlet mode is determined, as shown in FIG. 27, based on the target blow off temperature TAO. As the target blow off temperature TAO is changed from low to high, the air outlet mode is set in order of the face mode, the bilevel mode, and the foot mode in accordance with the map.

Next, at S2008, the opening SW of the air mixi door 2145 is determined based on the following Expression 2 memorized in the ROM.

$$\text{opening } SW=(TAO-TE)/(TW-TE) \times 100(\%) \quad \text{(Expression 2)}$$

Here, the target blow off temperature TAO is computed at S2004. The after-evaporator temperature TE is obtained from the after-evaporator temperature sensor 2175. The cooling water temperature TW is obtained from the water temperature sensor 2176.

Figure 28:
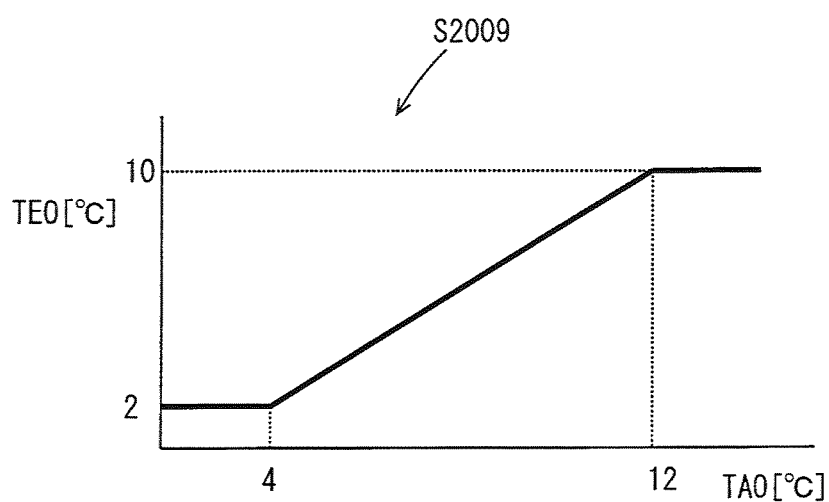
FIG. 28 is a flow chart illustrating a process for determining a target after-evaporator temperature in the air-conditioner of the sixth embodiment.

Next, at S2009, the target after-evaporator temperature TEO is determined, as shown in FIG. 28, based on the target blow off temperature TAO. As the target blow off temperature TAO is changed from low (4° C.) to high (12° C.), the target after-evaporator temperature TEO is raised from low (2° C.) to high (10° C.).

Figure 29:
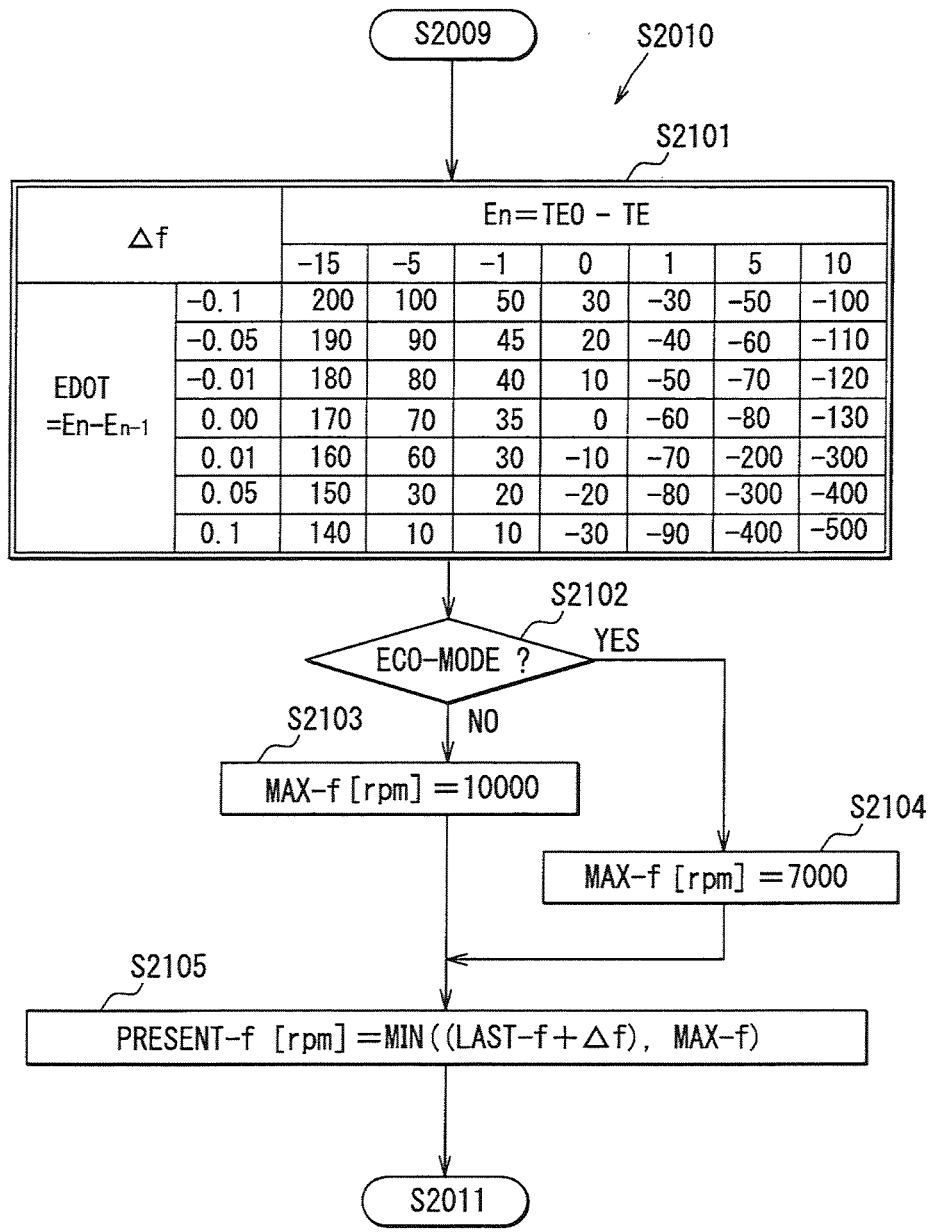
FIG. 29 is a flow chart illustrating a process for determining a compressor rotation speed in the air-conditioner of the sixth embodiment.

Next, at S2010, the rotation speed of the compressor 2131 (motor 2131a) is determined based on the subroutine (S2101-S2105) shown in FIG. 29.

At S2101, a temperature deviation En is calculated, using the following Expression 3, by subtracting an actual after-evaporator temperature TE from the target after-evaporator temperature TEO computed at S2009. A deviation variation rate EDOT is calculated using the following Expression 4.

$$En=TEO-TE \quad \text{(Expression 3)}$$

$$EDOT=En-En-1 \quad \text{(Expression 4)}$$

The value of En is updated once per second, therefore the value of En−1 is a value one second ago relative to En.

The example map (example at the time of cooling operation) representing the relationship among the deviation En, the deviation variation rate EDOT and the rotation number variation $\Delta f$ of the compressor 2131 is shown in S2101 of FIG. 29. The rotation number variation $\Delta f$ is calculated based on the map using the temperature deviation En and the deviation variation rate EDOT. One-second-later (present) compressor rotation number f is calculated by adding the rotation number variation $\Delta f$ to one-second-before compressor rotation number $f_{n-1}$ ($f=f_{n-1}+\Delta f$).

Alternatively, the rotation number variation $\Delta f$ calculated based on the deviation En and the deviation variation rate EDOT may be calculated through a fuzzy control based on a predetermined membership function and rule memorized in the ROM.

Next, it is determined whether the eco-mode switch is turned on at S2102 to set the eco-mode. When the eco-mode is not set at S2102, the maximum rotation number MAX-f is set as 10000 rpm at S2103. When the eco-mode is set at S2102, the maximum rotation number MAX-f is set as 7000 rpm at S2104.

At S2105, it is determined whether the sum of the last rotation number LAST-f and the rotation number variation Δf is smaller than the maximum rotation number MAX-f (10000 rpm or 7000 rpm) set at S2103 or S2104. The value of the smaller one is set as the present time compressor rotation number PRESENT-f.

The maximum rotation number is set as 7000 rpm at the eco-mode which is lower than 10000 rpm at the non-eco-mode. Thus, the maximum rotation number is reduced in the eco-mode to save the power consumption in the compressor 2131.

Next, at S2011, the operation number of the PTC heater (heater wires 2151-2153) of the electric heater 2150 is determined based on the subroutine (S2111-S2113) of FIG. 30.

At S2111, it is determined whether the blower switch is set ON. Specifically, it is determined that the blower switch 705 is ON when AUTO, LO, ME, or HI is set for the air amount, other than OFF. When it is determined that the blower switch is ON at S2111, the operation number of the electric heater 2150 is computed based on the engine-cooling-water temperature Tw detected by the sensor 2176, at S2112, using a map memorized in the ROM. As the cooling water temperature Tw is changed from low to high, the operation number of the electric heater 2150 is decreased (from three to one).

When it is determined that the blower switch is OFF at S2111, the electric heater 2150 is set OFF (operation number is zero) at S2113.

After the operation number of the electric heater 2150 is determined, the switch element SW1, SW2, SW3 of FIG. 22 is turned on or off based on the determination. Thus, the heat amount provided to air passing through the heater core 2141 can be controlled by the operation number of the electric heater 2150.

Figure 31:
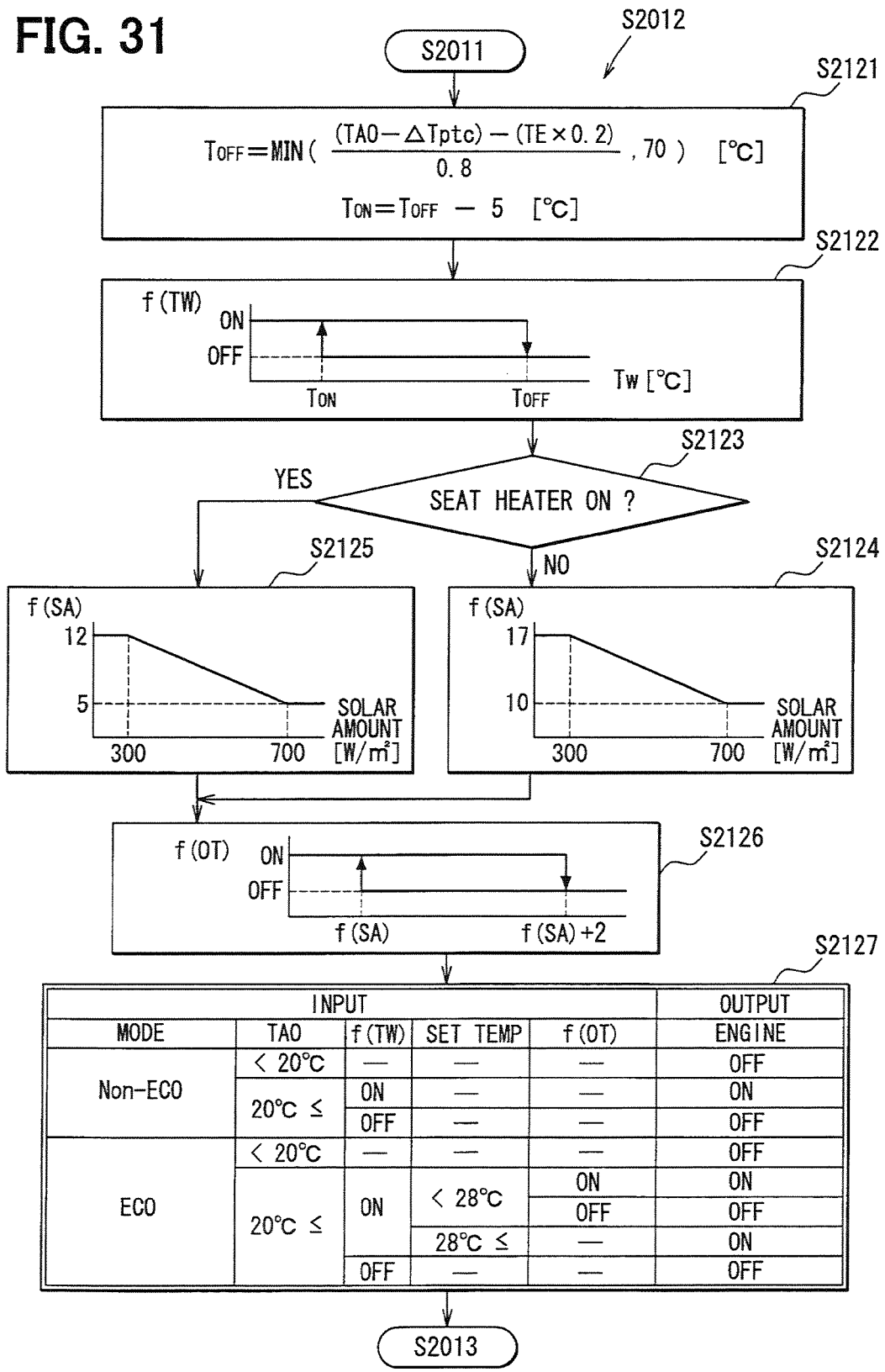
FIG. 31 is a flow chart illustrating a process for determining a required water temperature in the air-conditioner of the sixth embodiment.

Next, the required water temperature determination process (S2012) is explained with reference to the subroutine (S2121-S2127) of FIG. 31. The required temperature of the engine cooling water is determined based on the target blow off temperature TAO etc. in order to use the engine cooling water as a heat source for heating and defrosting.

At S2121, an engine-off water temperature Toff and an engine-on water temperature Ton are calculated, which are determination threshold value used for determining an engine-on demand based on the engine-cooling-water temperature Tw. The engine-off water temperature Toff is a threshold temperature for stopping the engine 2010, and the engine-on water temperature Ton is a threshold temperature for activating the engine 2010.

A reference engine-cooling-water temperature TwO is computed with the following Expression 5. The engine-off water temperature Toff is set into smaller one between the reference engine-cooling-water temperature TwO and 70° C., as shown in the following Expression 6.

$$TwO=\{(TAO-\Delta Tpct)-(TE\times 0.2)\}/0.8 \quad \text{(Expression 5)}$$

$$Toff=MIN(TwO,70) \quad \text{(Expression 6)}$$

The reference engine-cooling-water temperature TwO is an engine-cooling-water temperature Tw needed when it is assumed that the warm air temperature before air mix becomes to agree with the target blow off temperature TAO. TE represents the after-evaporator temperature. ΔTptc is an estimation value for an increase in the blow off temperature due to the electric heater 2150, and is calculated on a map according to the operation number of the electric heater 2150.

The engine-on water temperature Ton is set by subtracting a predetermined value such as 5° C. from the engine-off water temperature Toff, thereby restricting the engine 2010 from frequently turning on/off, as shown in the following Expression 7.

$$Ton=Toff-5 \quad \text{(Expression 7)}$$

Next, at S2122, it is determined whether the engine-on demand is needed based on the engine-cooling-water temperature Tw. At S2122, the engine-on demand is determined temporarily. Specifically, the actual engine-cooling-water temperature Tw is compared with the engine-off water temperature Toff and the engine-on water temperature Ton calculated at S2121. When the engine-cooling-water temperature is lower than the engine-on water temperature Ton, it is temporarily determined that the engine 2010 is turned on as f(Tw)=ON. When the engine-cooling-water temperature is higher than the engine-off water temperature Toff, it is temporarily determined that the engine 2010 is turned off as f(Tw)=OFF.

At S2123, it is determined whether the seat conditioning device 2102 is ON, which warms the seat for an occupant. When the seat conditioning device 2102 is OFF at S2123, f(SA) is calculated according to the solar amount SA at S2124. When the seat conditioning device 2102 is ON at S2123, f(SA) is calculated at S2125, which is lower than f(SA) at S2124.

At S2126, f(OT) is selected between ON and OFF according to the value of f(SA) calculated at S2124 or S2125. OT means the outside air temperature. At the control start time, f(OT) is set as OFF at S2126.

At S2127, it is determined whether there is a final engine-on demand relative to the engine 2010. When the eco-mode is not set, if the target blow off temperature TAO is higher than or equal to 20° C., and if f(TW)=ON, the engine 2010 is usually allowed to be ON. However, the engine 2010 is not allowed to be ON in the other case.

When the eco-mode is set, if the target blow off temperature TAO is higher than or equal to 20° C., if f(TW)=ON, if the preset temperature Tset is less than 28° C., and if f(OT)=ON, the engine-on demand is output. Further, if the target blow off temperature TAO is higher than or equal to 20° C., if f(TW)=ON, and if the preset temperature Tset is higher than or equal to 28° C., the engine-on demand is output. However, the engine-on demand is not output in the other case.

When the seat heater 2102 is ON at S2123, the value of f(SA) is made smaller, because the occupant easily feels too hot. It is made difficult to allow the engine-on demand when the seat heater 2102 is ON, thus fuel consumption can be reduced while the minimum heating is achieved. Furthermore, the noise can be reduced outside of the vehicle, and the power charged in the battery can be effectively used. Moreover, as the solar amount is increased, the engine-on demand is made difficult to be allowed, because the occupant easily feels too hot. Therefore, the minimum heating, the fuel saving, the noise reduction and the effective use of the charged power can be achieved.

Figure 32:
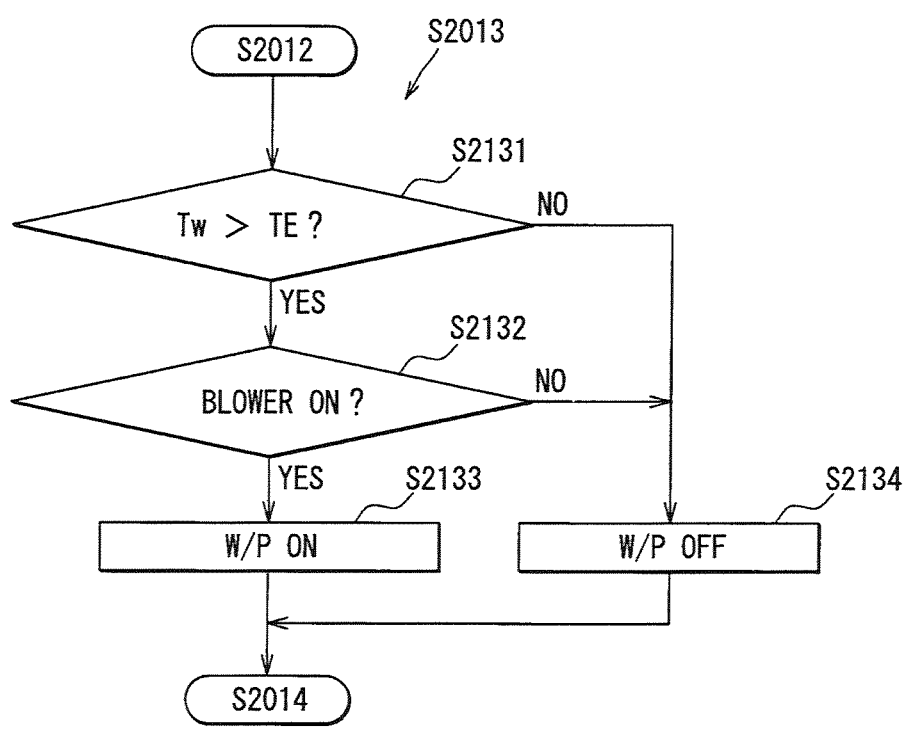
FIG. 32 is a flow chart illustrating a process for determining an operation of a water pump in the air-conditioner of the sixth embodiment.

Next, at S2013, the operation (on or off) of the water pump 2142 is determined based on, for example, the cooling water temperature Tw, with reference to the subroutine (S2131-S2134) shown in FIG. 32.

At S2131, it is determined whether the engine-cooling-water temperature Tw (water temperature) is higher than the after-evaporator temperature TE. When the water temperature Tw is determined to be higher than the evaporator temperature TE at S2131, the blower 2120 is determined to be ON (operating) or not at S2132. If the blower 2120 is determined to be ON, a pump-on demand is output at S2133. In contrast, when the water temperature Tw is determined to be lower than or equal to the after-evaporator temperature TE at S2131, or when the blower 2120 is determined to OFF at S2132, a pump-off demand is output at S2134.

While the engine-cooling-water temperature Tw is comparatively low and is lower than or equal to the after-evaporator temperature TE, if the engine cooling water is made to flow through the heater core 2141, the blow off temperature will be lowered. Therefore, the electric water pump 2142 is turned off at S2134.

When the engine-cooling-water temperature Tw is comparatively high and when the blower 2120 is OFF, the water pump 2142 is turned off to save the power. In contrast, when the blower 2120 is ON, the water pump 2142 is turned on. Thereby, the heat of the engine cooling water can be used for air-conditioning also when the engine 2010 is off. Therefore, the blow off temperature can be raised to agree with the target blow off temperature TAO. Thus, the temperature in the passenger compartment can be restricted from lowering even when the engine 2010 is off.

At S2014, control signals are output to obtain the set situation determined or calculated at S2004-S2013. Then, at S2015, when a predetermined time T elapses, S2002 is restarted.

As mentioned above, the air-conditioner ECU 2180A controls the air conditioning unit 2100A. Meanwhile, the seat ECU 2180B conducts the seat conditioning control relative to the seat conditioning unit 2100B while the automatic temperature control is performed for air in the passenger compartment. The control process of the seat conditioning unit 2100B is explained based on the flow chart (S2161-S2163) shown in FIG. 33.

The seat ECU 2180B starts the seat conditioning control by receiving a seat switch signal from the seat conditioning switch 2191. First, at S2161, a correction value α is determined (calculated) to correspond to the elapsed time (minute) from the timing of activating (starting) the seat conditioning unit 2100B based on the map memorized in the ROM.

The correction value α is set to become larger as the elapsed time becomes longer. Moreover, the correction value α is set to become smaller, as an initial inside air temperature Tr (initial temperature INITIAL-Tr in the passenger compartment at the start timing of air-conditioning) is lower when the seat conditioning unit 2100B is activated. That is, as the inside air temperature Tr is lower, the elapsed time required for having the same correction value α is made longer.

For example, as shown in the map of S2161, if the initial inside air temperature INITIAL-Tr is higher than or equal to 10° C., which is represented by a solid line, the correction value α is set as 0 in the elapsed time of 0-5 minutes, and is increased to 20 in the elapsed time of 5-10 minutes. Further, the correction value α is increased to 40 in the elapsed time of 10-20 minutes, and is made constant as 40 in the elapsed time of 20-35 minutes.

If the initial inside air temperature INITIAL-Tr is lower than 10° C., which is represented by a dashed line in the map of S2161, the correction value α is set as 0 in the elapsed time of 0-10 minutes, and is increased to 20 in the elapsed time of 10-15 minutes. Further, the correction value α is increased to 40 in the elapsed time of 15-25 minutes, and is made constant as 40 in the elapsed time of 25-35 minutes.

Figure 33:
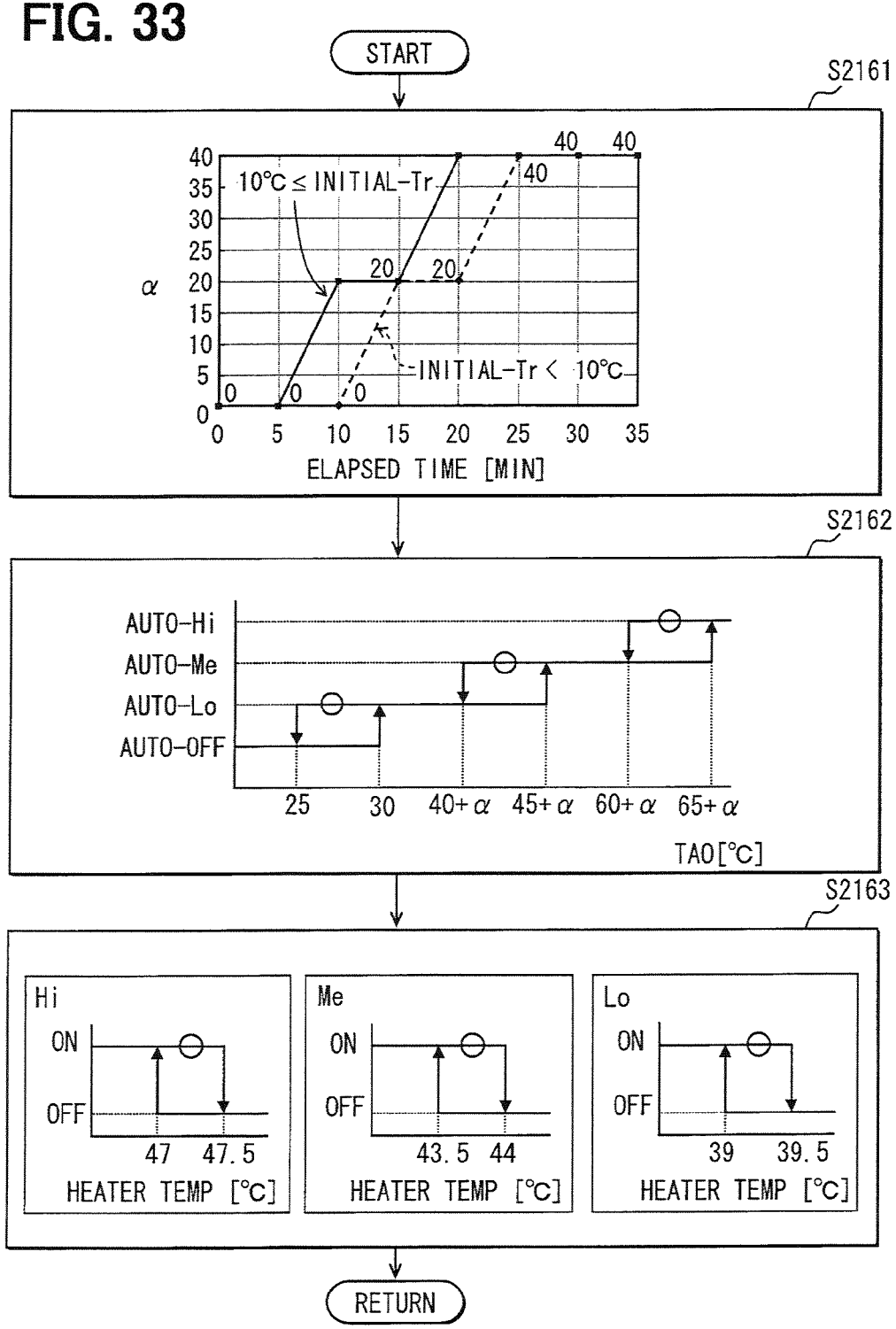
FIG. 33 is a flow chart illustrating temperature control of a seat heater in the air-conditioner of the sixth embodiment.

Next, at S2162, the seat temperature conditioning degree is determined among auto-Hi, auto-Me, auto-Lo and auto-OFF to correspond to a value of the target blow off temperature TAO which is corrected by adding the correction value α (see a difference between FIG. 8 and FIG. 33). The seat temperature conditioning degree may correspond to OFF, Lo, Me, and Hi in the heating level or OFF, Lo, Me, and Hi in the cooling level, for example. Here, explanation is provided in the case of the heating operation.

Basically, the heating level is determined in order of OFF, Lo, Me, and Hi, as the target blow off temperature TAO becomes larger. Here, for example, the target blow off temperature TAO is corrected by adding the correction value α for setting the auto-Me and the auto-Hi in the heating level. That is, because the correction value α is set larger as the elapsed time becomes longer, as shown in S2161, the target blow off temperature TAO corresponding to each heating level (Me, Hi) becomes larger. Therefore, the characteristics lines in the map of S2162 is shaped to move rightward substantially with the elapsed time. In other words, the heating level is set on the lower level under the situation having the same target blow off temperature TAO.

Next, the voltage impressed to the Peltier element is controlled so that the Peltier element obtains the heating degree (temperature) according to the set-up heating level (Hi, Me, Lo) at S2163. For example, in a case where the heating level is set at Hi, the voltage is impressed (ON) until the heating temperature of the Peltier element is raised to 47.5° C. Further, the voltage is not impressed (OFF) until the heating temperature of the Peltier element is lowered to 47° C., so the heating temperature can be obtained according to the Hi mode. Also in the Me or Lo mode, similar controlling is performed as the case of the Hi mode (refer to map in S2163).

According to the sixth embodiment, when the air-conditioner 2101 conducts the automatic temperature control for the passenger compartment, the seat conditioner 2102 lowers the conditioning degree (such as heating level in a heating operation time) of the seat conditioning unit 2100B with time elapsed (over time) from the operation start timing of the seat conditioner 2102.

Therefore, even when the outside air temperature is very low or very high, the seat ECU 2180B restricts the conditioning degree of the seat temperature from being maintained for a long time at the initial-setting value. Thus, too much heating or cooling can be restricted so as to continuously maintain comfortableness for an occupant.

Conventionally, when the outside air temperature is very low (or very high), in the initial stage after the seat conditioner 2102 is activated, the target blow off temperature TAO is set to very high value (or low value). The target blow off temperature TAO may be maintained as the very high value (or low value) for a long time. After the air-conditioning becomes sufficient in the passenger compartment by the air-conditioner 2101, if the conditioning degree of the seat temperature is maintained, the seat becomes too hot or too cold. In contrast, according to the sixth embodiment, the seat can be made comfortable by reducing the conditioning degree of the seat temperature over time elapsed after the seat conditioning is started.

Moreover, the seat ECU 2180B computes the conditioning degree of the seat temperature according to the target blow off temperature TAO which is computed based on the air-conditioning environmental condition. The target blow off temperature TAO is calculated based on the preset temperature Tset, the inside air temperature Tr, the outside air temperature Tam, and the solar amount Ts. Therefore, the occupant can feel comfortable at the time of starting the seat conditioning, because the conditioning degree of the seat temperature is computed based on the target blow off temperature TAO.

Moreover, the conditioning degree of the seat temperature is reduced by using the correction value α. The seat ECU 2180B delays the reduction in the conditioning degree of the seat temperature, as the initial inside air temperature INI- TIAL-Tr is lower in the heating operation (as the initial inside air temperature INITIAL-Tr is higher in the cooling operation).

Therefore, the time period necessary for maintaining the conditioning degree of the seat temperature is determined based on the inside air temperature INITIAL-Tr at the early stage of the air-conditioning. Thus, the timing, at which an occupant feels that the seat conditioning is enough, can be accurately controlled.

Other Embodiment

The present disclosure is not limited to the above embodiments. For example, the present disclosure may be applied to an air-conditioner using a heat pump cycle, instead of the air-conditioner using the air-conditioner cycle (cooler cycle).

The compressor is not limited to the electrically-driven compressor, and the vehicle may be a gasoline car, an electric motorcar (EV), etc. instead of the hybrid car.

The seat conditioner device may be equipped with not both the seat heater and the seat cooler. The seat heater and the seat cooler may be provided with a single equipment, or may be provided with separate equipments, respectively. Furthermore, the seat conditioner device may have only the seat heater or the seat cooler. Moreover, the seat conditioning ECU may be incorporated into the air-conditioner ECU.

The seat conditioner device heats or cools the seat itself. Alternatively, the seat conditioner device may indirectly control the temperature of the seat by blowing off conditioned-air from the other part of the vehicle adjacent to the seat. The seat temperature control system may be defined to include such equipment and the seat conditioner device.

In the above embodiments, the eco-mode is set by operating the eco-mode switch. Alternatively, the eco-mode may be automatically set based on the remaining fuel amount or the state of the battery in which the remaining electric-power is small for driving the electric car.

The eco-mode is an energy-saving mode in which the air-conditioning degree is lowered, and is not limited to a mode in which the power of the compressor is saved. For example, the blower air amount or the flow rate of water flowing through the inside of the heater core may be reduced at the eco-mode instead of the power of the compressor.

The ignition switch may be a start-up switch or a starter switch starting the electric car which has no ignition device.

The seat conditioner may conduct the seat conditioning control for a cooling operation instead of the heating operation.

The air-conditioner is equipped with the air-conditioner ECU, and the seat conditioner is equipped with the seat ECU. Alternatively, the air-conditioner ECU and the seat ECU may be integrated into one ECU. In this case, the flow chart of FIG. 33 is inserted between S2013 and S2014 of FIG. 24.

The air-conditioner and the seat conditioner are not limited to be applied to the hybrid car. Alternatively, the air-conditioner and the seat conditioner may be applied to an idle stop vehicle which is equipped with only an engine to be suspended at an idle stop time.

Such changes and modifications are to be understood as being within the scope of the present disclosure as defined by the appended claims.

What is claimed is:

1. An air-conditioner that conducts an air-conditioning for a passenger compartment of a vehicle, the air-conditioning having an eco-mode to save energy, the air-conditioner comprising:

a seat temperature control system configured to heat or cool a seat in the passenger compartment; and
a controller that automatically activates the seat temperature control system when the eco-mode is set; wherein
the seat temperature control system has
a seat manual mode in which the seat is heated or cooled based on a manually set value, and
a seat auto mode in which the seat is heated or cooled based on an automatically set value,
the controller automatically activates the seat temperature control system with the seat auto mode when the eco-mode is set;
the controller automatically activates the seat temperature control system with the seat auto mode when the eco-mode is set at a timing when the vehicle is activated, and
the controller prohibits the seat temperature control system from activating when a non-eco-mode other than the eco-mode is set at the timing when the vehicle is activated.

2. The air-conditioner according to claim 1, wherein
the seat temperature control system includes
a seat conditioner device heating or cooling the seat in the passenger compartment, and
an eco-mode switch through which the eco-mode is set, and
the controller automatically activates the seat conditioner device when the eco-mode is set by the eco-mode switch.

3. The air-conditioner according to claim 1, wherein
the air-conditioning further has an auto mode in which a temperature of conditioned-air is automatically controlled, and
the controller automatically activates the seat temperature control system when the eco-mode is set and when the auto mode is set.

4. The air-conditioner according to claim 3, wherein
the seat temperature control system includes an auto mode switch through which the auto mode is set, and
the controller automatically activates the seat temperature control system when the eco-mode is set and when the auto mode is set through the auto mode switch.

5. The air-conditioner according to claim 1, wherein
the seat temperature control system further includes
an activation signal generator generating a first signal activating the vehicle, and
an air-conditioning start signal generator generating a second signal starting the air-conditioning, and
the controller automatically activates the seat temperature control system in response to the first signal or the second signal when the eco-mode is set.

6. The air-conditioner according to claim 1, wherein
the seat temperature control system has a seat cooler and a seat heater.

7. An air-conditioner that conducts an air-conditioning for a passenger compartment of a vehicle, the air-conditioning having an eco-mode to save energy, the air-conditioner comprising:

a seat temperature control system configured to heat or cool a seat in the passenger compartment; and
a controller that automatically activates the seat temperature control system when the eco-mode is set; wherein
the seat temperature control system has
a seat manual mode in which the seat is heated or cooled based on a manually set value, and
a seat auto mode in which the seat is heated or cooled based on an automatically set value, the controller automatically activates the seat temperature control system with the seat auto mode when the eco-mode is set;

the seat temperature control system further has a load determiner determining a load of the air-conditioning, the controller automatically activates the seat temperature control system with the seat auto mode when the eco-mode is set at a timing when the vehicle is activated, and the controller prohibits the seat temperature control system from activating when a non-eco-mode other than the eco-mode is set and when the load is smaller than a predetermined value at the timing when the vehicle is activated.

8. The air-conditioner according to claim 7, wherein
the load determiner determines the load of the air-conditioning based on a temperature of air outside of the vehicle.

9. The air-conditioner according to claim 1 is applied to an electric car which is driven only by a motor.

10. The air-conditioner according to claim 7, wherein
the seat temperature control system includes
a seat conditioner device heating or cooling the seat in the passenger compartment, and
an eco-mode switch through which the eco-mode is set, and
the controller automatically activates the seat conditioner device when the eco-mode is set by the eco-mode switch.

11. The air-conditioner according to claim 7, wherein
the air-conditioning further has an auto mode in which a temperature of conditioned-air is automatically controlled, and
the controller automatically activates the seat temperature control system when the eco-mode is set and when the auto mode is set.

12. The air-conditioner according to claim 7, wherein
the seat temperature control system includes an auto mode switch through which the auto mode is set, and
the controller automatically activates the seat temperature control system when the eco-mode is set and when the auto mode is set through the auto mode switch.

13. The air-conditioner according to claim 7, wherein
the seat temperature control system further includes
an activation signal generator generating a first signal activating the vehicle, and
an air-conditioning start signal generator generating a second signal starting the air-conditioning, and
the controller automatically activates the seat temperature control system in response to the first signal or the second signal when the eco-mode is set.

14. The air-conditioner according to claim 7, wherein
the seat temperature control system has a seat cooler and a seat heater.

15. The air-conditioner according to claim 7 is applied to an electric car which is driven only by a motor.

* * * * *